(12) United States Patent
Beltrame et al.

(10) Patent No.: US 11,851,568 B2
(45) Date of Patent: Dec. 26, 2023

(54) INK COMPOSITION FOR INKJET PRINTING

(71) Applicant: Domino Printing Sciences Plc, Cambridge (GB)

(72) Inventors: Emanuela Morgan Beltrame, Cambridge (GB); Mary Thomson, Cambridge (GB)

(73) Assignee: Domino Printing Sciences PLC, Cabridge (GB)

(*) Notice: Subject to any disclaimer, the term of this patent is extended or adjusted under 35 U.S.C. 154(b) by 0 days.

(21) Appl. No.: 17/042,577

(22) PCT Filed: Mar. 28, 2019

(86) PCT No.: PCT/EP2019/057910
§ 371 (c)(1),
(2) Date: Sep. 28, 2020

(87) PCT Pub. No.: WO2019/185825
PCT Pub. Date: Oct. 3, 2019

(65) Prior Publication Data
US 2021/0017411 A1    Jan. 21, 2021

(30) Foreign Application Priority Data
Mar. 28, 2018  (GB) ...................... 1804959

(51) Int. Cl.
*C09D 11/03* (2014.01)
*C09D 11/36* (2014.01)
(Continued)

(52) U.S. Cl.
CPC ................ *C09D 11/38* (2013.01); *B41J 2/01* (2013.01); *B41J 2/2107* (2013.01);
(Continued)

(58) Field of Classification Search
CPC ......... C09D 11/03; C09D 11/36; C09D 11/38; C09D 11/52
See application file for complete search history.

(56) References Cited

U.S. PATENT DOCUMENTS 6,010,564 A   1/2000  Zhu et al.
6,140,391 A  10/2000  Zou et al.
(Continued)

FOREIGN PATENT DOCUMENTS

CN    101180373 A    5/2008
CN    104231746 A   12/2014
(Continued)

OTHER PUBLICATIONS

BYK 064 Date Sheet (from BYK-Chemie USA). http://www.uni-trading.com/sub/support/tds.msds/additive/BYK/BYK_etc/TDS/BYK-065%20TDS(EN).pdf.*
(Continued)

*Primary Examiner* — Khanh T Nguyen
(74) *Attorney, Agent, or Firm* — Stites & Harbison PLLC; Richard S. Meyers, Jr.

(57) ABSTRACT

This application relates to ink compositions, in particular ink compositions for use in continuous inkjet printing. The ink compositions are suitable for producing printed images for example with reduced printer error and good adhesion to low surface energy substrates, in particular, low energy substrates such as polypropylene, LDPE and HDPE. The ink composition contains a liquid carrier and carbon black. The ink composition has a surface resistance of at least 2 MΩ/sq after washing the printed deposit with the liquid carrier and an adhesion of 50% or more after applying an adhesive tape to the printed deposit and removing the adhesive tape.

20 Claims, 1 Drawing Sheet

(51) Int. Cl.
*C09D 11/38* (2014.01)
*B41M 5/00* (2006.01)
*B41M 5/50* (2006.01)
*C09D 11/102* (2014.01)
*C09D 11/324* (2014.01)
*C09D 11/10* (2014.01)
*C09D 11/52* (2014.01)
*B41J 2/21* (2006.01)
*B41J 2/01* (2006.01)
*C08K 3/105* (2018.01)
*C08K 3/32* (2006.01)

(52) U.S. Cl.
CPC .......... *B41M 5/0023* (2013.01); *B41M 5/502* (2013.01); *C09D 11/03* (2013.01); *C09D 11/10* (2013.01); *C09D 11/102* (2013.01); *C09D 11/324* (2013.01); *C09D 11/36* (2013.01); *C09D 11/52* (2013.01); *C08K 3/105* (2018.01); *C08K 2003/324* (2013.01)

(56) References Cited

U.S. PATENT DOCUMENTS

| | | | |
|---|---|---|---|
| 6,203,605 | B1 | 3/2001 | Thakkar et al. |
| 2004/0110868 | A1 | 6/2004 | Zhu et al. |
| 2004/0154495 | A1* | 8/2004 | Zhu ................. C09D 11/36 106/31.41 |
| 2006/0013641 | A1* | 1/2006 | Morita ................. C09D 11/18 401/190 |
| 2007/0248838 | A1 | 10/2007 | Marken-Imaje |
| 2008/0193725 | A1 | 8/2008 | De Saint-Romain |
| 2013/0260037 | A1 | 10/2013 | Paiz et al. |
| 2014/0204156 | A1 | 7/2014 | Gotou |
| 2014/0038585 | A1 | 12/2014 | Li et al. |
| 2014/0378585 | A1* | 12/2014 | Li ................. C09D 11/328 524/90 |

FOREIGN PATENT DOCUMENTS

| | | |
|---|---|---|
| CN | 104277578 A | 1/2015 |
| EP | 1323788 | 7/2003 |
| EP | 1915432 | 4/2008 |
| EP | 1879969 | 9/2010 |
| EP | 2736984 | 6/2018 |
| GB | 2575229 A | 3/2018 |
| JP | 55115478 A | 9/1980 |
| JP | 57-090068 A | 6/1982 |
| JP | 60092370 A | 5/1985 |
| JP | 60118767 A | 6/1985 |
| JP | 2008-297446 A | 12/2008 |
| JP | 2011-105818 A | 6/2011 |
| WO | WO00/22055 A1 | 4/2000 |
| WO | WO20060120227 A1 | 11/2006 |
| WO | WO20070022161 A1 | 2/2007 |
| WO | WO2013/019384 A2 | 2/2013 |
| WO | WO2014118330 A1 | 8/2014 |
| WO | WO2018/206774 A1 | 11/2018 |

OTHER PUBLICATIONS

Search Report dated Jul. 24, 2018 issued in Application No. GB1804959.3.
International Search Report dated Jun. 6, 2019 issued in Application No. PCT/EP2019/057910.
International Search Report dated Jun. 6, 2019 issued in Application No. PCT/EP2019/057873.
Extended European Search Reported dated Jul. 7, 2023 for corresponding Europe Application No. 23159247.8.

* cited by examiner

A　　　　　B
1-NS 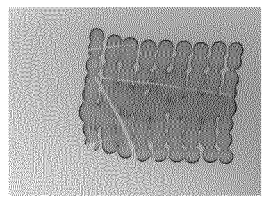 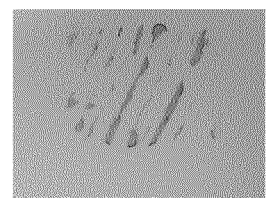
1 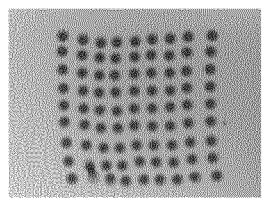 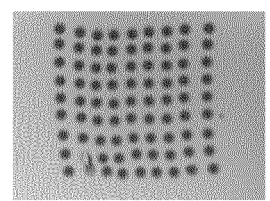
A　　　　　B
C1-NS 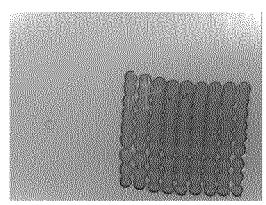 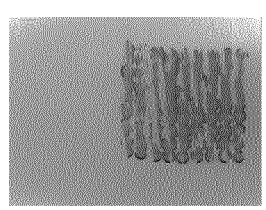
C1 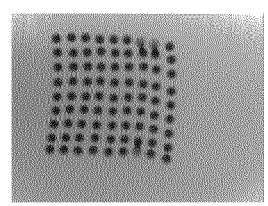

INK COMPOSITION FOR INKJET PRINTING

CROSS REFERENCE TO RELATED APPLICATIONS

This application is a § 371 National State Application of PCT/EP2019/057910 filed Mar. 28, 2019 which claims priority to GB 1804959.3 filed Mar. 28, 2018.

FIELD OF THE INVENTION

This invention relates to an ink composition, in particular an ink composition for use in continuous inkjet printing.

BACKGROUND

EP 1 879 969 is concerned with ingestible ink compositions for use in continuous inkjet printing directly onto foodstuffs and pharmaceuticals. These ink compositions comprise a liquid carrier, a colourant, a siloxane surfactant and, where these components would not provide sufficient electrical conductivity for continuous inkjet printing, a metal conductivity salt.

The siloxane surfactant is present in an amount of 0.1% by weight of the ink compositions of EP 1 879 969 and is stated to be for the purpose of modifying and regulating the surface tensions of the ink compositions.

EP 1 879 969 does not mention using the ingestible ink compositions to print on low surface energy substrates such as polypropylene (PP) and high- and low-density polyethylene (HDPE and LDPE), but, given the siloxane surfactant and conductivity salt content of these ink compositions, a person skilled in the art of ink formulation would expect the adhesion of these ink compositions to such low surface energy substrates to be poor.

It is an object of the present invention to provide an ink composition for continuous inkjet printing that has good adhesion to low surface energy substrates.

Carbon black pigments are desirable for use in continuous inkjet (CIJ) printing. Further problems that may be associated with such inks are printer errors.

These errors may be caused by electrical shorting of the charge electrode in the printer or other electrically conductive parts of the printer. The problem of electrical shorting is conventionally considered to be caused by the build-up of ink in electrically conductive parts of the printer, such as the charge electrode.

These errors may also be caused by clogging of the printer parts by the carbon black pigment.

Attempts to address these problems include processing of carbon black to provide fine particles and prevent clogging (see, for example EP1915432), reducing the amount of carbon black for example by combining carbon black and another colourant (see for example EP2736984), and chemically modifying the carbon black to increase solubility and avoid clogging (see, for example EP1323788 or U.S. Pat. No. 6,203,605). These approaches all require additional formulation or production steps in order to provide the ink. Some require the use of additional reagents or components in the compositions.

In many cases, printers are adapted to be able to wash the charge electrode and other printer components that come into contact with the ink. The aim of the washing step is to prevent build-up of ink on the charge electrode and other printer components and reduce the problem of printer errors. However, electrical shorting still occurs.

It is an object of the present invention to provide an ink composition, such as an ink composition for continuous inkjet printing, that further reduces or eliminates the problems of printer errors, for example by reducing or preventing electrical shorting at the charge electrode, whilst maintaining good print quality such as good adhesion.

It is an alternative or additional object of the present invention to provide a commercially useful alternative to known ink compositions.

SUMMARY OF THE INVENTION

In a first aspect, the present invention provides an ink composition, in particular an ink composition for use in continuous inkjet printing, having a siloxane surfactant and a metal conductivity salt, which ink composition is suitable for producing printed images with good adhesion to low surface energy substrates, in particular, low surface energy substrates such as polypropylene, LDPE and HDPE.

Accordingly, in a first aspect, the present invention provides an ink composition comprising a liquid carrier, a colourant, a siloxane surfactant and a metal conductivity salt, wherein the siloxane surfactant is present in an amount greater than 0.1% by weight of the ink composition.

The combination in an ink composition of a siloxane surfactant present in an amount greater than 0.1% by weight of the ink composition and a metal conductivity salt surprisingly allows printed images to be produced on low surface energy substrates, which images have good adhesion to such substrates. This is contrary to the expectation that the adhesion to low surface energy substrates of an ink composition containing a siloxane surfactant and a conductivity salt would be poor.

In a second aspect, the present invention provides an ink composition, in particular an ink composition for use in continuous inkjet printing, having carbon black and a liquid carrier which ink composition reduces printer errors and is suitable for producing printed images with good adhesion to low surface energy substrates, in particular, low surface energy substrates such as polypropylene, LDPE and HDPE.

Accordingly, in a second aspect, the invention provides an ink composition having a liquid carrier and carbon black. The ink composition has a surface resistance of at least 2 MΩ/sq after washing the printed deposit with the liquid carrier and an adhesion of 50% or more after applying an adhesive tape to the printed deposit and removing the adhesive tape.

In another aspect the present invention provides a printed deposit formed using the ink composition of the first aspect of the invention. The printed deposit comprises a colourant, a siloxane surfactant and a metal conductivity salt.

In this way the invention provides an ink composition for producing a printed deposit and a printed deposit, which printed deposit has good adhesion to low surface energy substrates.

In another aspect the present invention provides a printed deposit formed using the ink composition of the second aspect of the invention. The printed deposit comprises a carbon black.

In this way the invention provides an ink composition for producing a printed deposit and a printed deposit, which printed deposit has good adhesion and reduces printer errors.

The ink compositions of the first aspect of the invention or the second aspect of the invention are compatible with the components of an inkjet printer, and more particularly a continuous inkjet printer. The ink compositions are suitable for application directly onto products and/or product packaging to achieve durable printed images.

These and other aspects and embodiments of the invention are described in further detail below.

SUMMARY OF THE FIGURE

FIG. 1 is a set of four pairs of digital microscope photographs of test images:

- 1-NS was printed using an ink otherwise in accordance with the invention but without the siloxane surfactant;
- 1 was printed using an ink in accordance with the invention. This is the same ink as in 1-NS except in this case the ink has the siloxane surfactant;
- C1-NS was printed using a comparative ink using a non-metal conductivity salt instead of the metal conductivity salt and without the siloxane surfactant; and
- C1 was printed using the comparative ink with a siloxane surfactant. This is the same ink as in C1-NS except in this case the ink has the siloxane surfactant.

The left hand one of each pair of photographs (A) being taken before, and the right hand one (B) after, a tape removal adhesion test on HDPE.

DETAILED DESCRIPTION OF THE INVENTION

The present invention provides two ink compositions. The ink composition of the first aspect and the ink composition of the second aspect.

First Aspect

In the first aspect, the invention provides an ink composition including a liquid carrier, a colourant, a siloxane surfactant and a metal conductivity salt, wherein the siloxane surfactant is present in an amount greater than 0.1% by weight of the ink composition. The liquid carrier may be in the form of an organic solvent.

The presence of the metal conductivity salt enables low conductivity colourants, such as non-ionic dyes and pigment dispersions, to be used in the ink compositions of the invention.

Low conductivity in this context means that the colourant alone does not provide the electrical conductivity required for continuous inkjet printing. That is to say, where the colourant of the ink composition of the invention is a low conductivity colourant, in the absence of the metal conductivity salt, the ink composition of the invention would have insufficient electrical conductivity for use in continuous inkjet printing.

Preferably the ink composition of the first aspect described herein has a viscosity of about 0.5 to 8 mPa·s, more preferably from 1 to 6.5 mPa·s and even more preferably from 2 to 5.5 mPa·s at 25° C. Preferably the ink composition described herein has a viscosity of less than 7 mPa·s, more preferably less than 5.5 mPa·s at 25° C. Preferably the ink composition described herein has a viscosity of greater than 0.5 mPa·s, more preferably greater than 1 mPa·s, even more preferably greater than 3 mPa·s at 25° C. The viscosity of the ink compositions may be in a range with the upper and lower limits selected from the amounts described above. The viscosity of the ink composition may be measured using a viscometer such as a Brookfield DV-II+ viscometer.

Preferably the ink composition of the first aspect as described herein have a static surface tension of from 20 to 50 mN/m, more preferably from 20 to 40 mN/m at 25° C., most preferably from 20 to 30 mN/m. The static surface tension of the composition may be measured using equipment such as a du Nouy ring tensiometer or using the pendant drop method on a KSV Cam 200 optical tensiometer. The static surface tension of the ink composition may alternatively be measured using a bubble pressure tensiometer, such as a SITA pro line t15.

Colourant

The ink composition and the printed deposit of the first aspect of the invention comprise a colourant. The colourant is not particularly limited and any suitable colourant known in the art may be used.

In some embodiments, the colourant may be a low conductivity colourant. Where the colourant is a low conductivity colourant, for example a non-ionic dye or a pigment dispersion, the electrical conductivity of the ink composition in the absence of the metal conductivity salt is less than 300 µS/cm, and preferably less than 200 µS/cm, at 25° C.

The electrical conductivity of the ink composition in the absence of the metal conductivity salt may be measured using an EDT Series 3 BA 380 conductivity meter using an EDT E8070 Polymer Conductivity Cell probe, with the sample warmed by a water bath at a temperature of 25° C.

Where the colourant is a low conductivity colourant, in the absence of a metal conductivity salt the ink composition may be non-conductive because the low conductivity colourant is non-conductive. For example, the low conductivity colourant may be non-ionic (i.e. completely uncharged).

In some embodiments, the colourant is a non-ionic colourant, for example a non-ionic dye or a pigment. For example, it may be a completely uncharged dye such as Solvent Blue 104. Preferably the colourant is a pigment. The pigment may be in the form of a dispersion in the composition. The pigment may be an inorganic or an organic pigment.

The term 'non-ionic' as used herein refers to substances that are not ions and do not dissociate into ions in solution. That is, the term 'non-ionic' refers to substances which are not salts and contain no formal charge.

Where the colourant is a low conductivity colourant, in the absence of a metal conductivity salt the ink composition may have a low level of conductivity because the low conductivity colourant is an ionic complex with low dissociation in the liquid carrier. Low dissociation in this context means that the electrical conductivity of the ink composition in the absence of the metal conductivity salt is less than 300 µS/cm, or preferably less than 200 µS/cm, at 25° C.

In some embodiments, the colourant is a pigment in the form of an ionic complex with low or no dissociation in the liquid carrier. For example, it may be Pigment Blue 15:2, which is an ionic complex with low or no dissociation in most liquid carriers.

In other embodiments, the colourant is an ionic dye with good dissociation in the liquid carrier, but the colourant is present in a sufficiently low concentration that, in the absence of a metal conductivity salt, the electrical conductivity of the ink composition is less than 400 µS/cm, preferably less than 300 µS/cm, and more preferably still less than 200 µS/cm.

It will be appreciated that a dispersion of a conductive pigment, such as carbon black, may constitute a low conductivity colourant if a dispersant and/or solvent forming part of the dispersion hinders electrical contact between the particles of the pigment.

Preferably, an ink composition comprising a low conductivity colourant has a conductivity in the absence of the metal conductivity salt of less than 400 µS/cm at any concentration. More preferably, such an ink composition has a conductivity in the absence of the metal conductivity salt of less than 300 µS/cm, for example, less than 200 µS/cm and most preferably less than 100 µS/cm.

In some cases, the colourant is present in the ink composition at between 1 to 25 wt % based on total weight of the ink composition, more preferably 1.3 to 15 wt %, and most preferably 2 to 7 wt % based on total weight of the ink composition.

An ink composition where the colourant is a low conductivity colourant and without a metal conductivity salt has a conductivity of less than 400 µS/cm when the colourant is present in these amounts. More preferably, the ink composition without the metal conductivity salt has a conductivity of less than 300 µS/cm, for example, less than 200 µS/cm and most preferably less than 100 µS/cm.

Preferably, an ink composition where the colourant is a low conductivity colourant and without a metal conductivity salt has a conductivity of less than 400 µS/cm when the colourant is present in the ink composition at around 3 wt % based on total weight of the ink composition. More preferably, the ink composition without the metal conductivity salt has a conductivity of less than 300 µS/cm, for example, less than 200 µS/cm and most preferably less than 100 µS/cm.

Preferably the colourant is a low conductivity pigment. The low conductivity pigment may be in the form of a dispersion in the composition. The low conductivity pigment may be an inorganic or an organic pigment.

Preferably, the colourant is a carbon black. The carbon black may be provided as a solid (e.g. powder or bead) or a dispersion formulation (e.g. a dispersion in a solvent).

In this way, the present invention provides a carbon-black ink with good adhesion properties that can be used in coding and marking applications for example on common food packaging materials.

Carbon black may be produced by the incomplete combustion of heavy petroleum products such as FCC tar, coal tar, ethylene cracking tar or by charring organic materials such as wood or bone. Carbon black may be a form of paracrystalline carbon that has a high surface-area-to-volume ratio. Carbon black may contain oxygen complexes (e.g. carboxylic, quinonic, lactonic, phenolic groups and others) absorbed onto the surface of the carbon. In some cases carbon black may be acid-oxidized by spraying acid onto the carbon during the manufacturing process to change the inherent surface chemistry. The amount of chemically-bonded oxygen on the surface area of the carbon black can be increased to enhance performance characteristics.

Many carbon black products are advertised as conductive. Indeed, carbon black is conductive as a dry material. Nevertheless, carbon black may constitute a low conductivity colourant as referred to herein if the carbon black does not provide sufficient conductivity to the ink composition for continuous inkjet printing.

It is proposed that the electrons in carbon black as a dry material are free to move between the particles of the carbon black and provide conductivity, but are not free to move between the particles when the carbon black is suspended in the liquid carrier.

Carbon blacks suitable for the ink composition of the invention include carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 250R, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; carbon blacks manufactured by Orion, for example, Printex 45, Printex 35, Printex nature, Special Black 350, Special Black 535, Printex 3, Printex 30, Special Black 275; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Suitable pigments for use in yellow ink compositions of the invention include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 139.

Suitable pigments for use in magenta ink compositions of the invention include C.I. Pigment Red 5, C.I. Pigment Red 7, C.I. Pigment Red 12, C.I. Pigment Red 48 (Ca), C.I. Pigment Red 48 8 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 176, C.I. Pigment Red 254, C.I. Pigment Red 255, C.I. Pigment Red 272, C.I. Pigment Red 254, C.I. Pigment Orange 64, and C.I. Pigment Orange 73.

Suitable pigments for use in cyan ink compositions of the invention include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4, C.I. Vat Blue 60, C.I. Pigment Blue 15:2, C.I. Pigment Blue 15:4, C.I. Pigment Green 3, C.I. Pigment Violet 23 and C.I. Pigment Violet 37.

Preferably, the pigment is an organic pigment selected from C.I. Pigment Red 176, C.I. Pigment Red 254, C.I. Pigment Red 255, C.I. Pigment Red 272, C.I. Pigment Red 254, C.I. Pigment Orange 64, C.I. Pigment Orange 73, C.I. Pigment Yellow 83, C.I. Pigment Yellow 138, C.I. Pigment Yellow 139, C.I. Pigment Yellow 151, C.I. Pigment Yellow 154, C.I. Pigment Blue 15:2, C.I. Pigment Blue 15:3, C.I. Pigment Blue 15:4, C.I. Pigment Green 3, C.I. Pigment Violet 23 and C.I. Pigment Violet 37.

Low conductivity organic pigments may be selected from carbon black, polycyclic pigments (for example, phthalocyanine, perylene, perinone, anthraquinone, quinacridone, dioxazine, thioindigo, isoindolinone, and quinophthalone pigments) and azo-pigments.

Suitable dyes include Oil Black 860 (C.I. Solvent Black 3), Solvaperm Blue 2B or other Solvent Blue 104 dyes, Orasol Blue 855, Orasol Blue 825 (C.I. Solvent Blue 67), Neptune Blue 722 (C.I. Solvent Blue 4), Oil Blue 613 (C.I. Solvent Blue 5), Savinyl Blue GLS (C.I. Solvent Blue 44), Valifast Blue 2606 (C.I. Solvent Blue 70), Valifast Blue 2620 (C.I. Solvent Blue 44), Millijet Black J10, C.I. Solvent Black 7, 27, 28, 29, 35, 48, 49, C.I. Solvent Blue 35, 38, 44, 45, 79, 98, 100, 129, C.I. Solvent Red 8, 49, 68, 89, 124, 160, 164, C.I. Solvent Yellow 83:1, 126, 146, 162, C.I. Solvent Green 5, C.I. Solvent Orange 97, C.I. Solvent Brown 20, 52, and C.I. Solvent Violet 9, of which Solvaperm Blue 2B and Orasol Blue 855 are preferred low conductivity dyes and C.I. Solvent Black 27 and 29 are preferred ionic dyes with good dissociation in common organic solvents.

Preferably the colourant is present in between 1 to 25 wt % based on total weight of the ink composition, more preferably 1.3 to 15 wt %, and most preferably 2 to 7 wt % based on total weight of the ink composition.

Preferably, the colourant is present in less than 25 wt % based on total weight of the ink composition, more preferably less than 15 wt %, more preferably less than 6 wt % and even more preferably less than 4 wt %. Preferably, the colourant is present in greater than 1 wt % based on total weight of the ink composition, preferably greater than 1.3 wt %, and even more preferably greater than 2 wt %. The colourant may be present in an amount that is in a range with the upper and lower limits selected from the amounts described above.

In this way the ink composition may have the desired opacity and colour.

Metal Conductivity Salt

The ink composition and the printed deposit of the first aspect of the invention comprises a metal conductivity salt.

The combination of a metal conductivity salt and a siloxane surfactant present in an amount greater than 0.1% by weight of the ink composition surprisingly results in an improvement to the generally poor adhesion to low surface energy substrates of printed images produced using ink compositions containing a siloxane surfactant and a metal conductivity salt. That is, the combination provides improved adhesion to low surface energy substrates. This reversal of the detrimental effect of the presence of a siloxane surfactant and a metal conductivity salt on adhesion is surprising, in particular given that the reversal is not observed when non-metal conductivity salts are used in an ink composition.

Salts are composed of related numbers of cations (positively charged ions) and anions (negatively charged ions) so that the product is electrically neutral (without a net charge). A metal conductivity salt is a salt in which the cation is a metal cation.

The cation may be a group 1 metal ion (alkali metal ion), such as a cation selected from potassium, lithium or sodium cations. Preferably, the cation is a potassium cation.

The anion may be any suitable anion, for example it may be an organic or an inorganic anion, it may be a monoatomic or polyatomic anion. The anion may be selected from $PF_6^-$, $CN^-$, $Cl^-$, $F^-$, $I^-$, $Br^-$, $SCN^-$, $C_6H_7O_2^-$, $CF_3SO_3^-$ or $NO_3^-$. Preferably, the anion is $PF_6^-$ or $I^-$.

Preferably, the metal conductivity salt is selected from lithium nitrate, lithium triflate, potassium hexafluorophosphate, sodium hexafluorophosphate, potassium sorbate, potassium thiocyanate, sodium thiocyanate, sodium iodide or potassium iodide. More preferably, the metal conductivity salt is potassium hexafluorophosphate and/or potassium iodide.

Preferably, the metal conductivity salt is present at 4.0 wt % or less based on total weight of the ink composition, more preferably 2.0 wt % or less and even more preferably 1.5 wt % or less. Preferably, the metal conductivity salt is present at 0.3 wt % or more based on total weight of the ink composition, preferably 0.5 wt % or more, and even more preferably 0.8 wt % or more. The metal conductivity salt may be present in an amount that is in a range with the upper and lower limits selected from the amounts described above. For example, the metal conductivity salt is present at 0.3 to 4.0 wt % based on total weight of the ink composition.

Preferably, the metal conductivity salt is present in an amount that provides an ink composition with a conductivity of less than 2200 μS/cm, more preferably less than 1900 μS/cm and even more preferably less than 1500 μS/cm. Preferably, the metal conductivity salt is present in an amount that provides an ink composition with a conductivity greater than 200 μS/cm, preferably greater than 500 μS/cm, preferably greater than 800 μS/cm, and even more preferably greater than 1200 μS/cm. The metal conductivity salt may be present in an amount to give a conductivity that is in a range with the upper and lower limits selected from the amounts described above. For example, the ink composition has a conductivity of from 500 to 2200 μS/cm.

Conductivity may be measured using an EDT Series 3 BA 380 conductivity meter using an EDT E8070 Polymer Conductivity Cell probe, with the sample warmed by a water bath at a temperature of 25° C.

Siloxane Surfactant

The ink composition of the first aspect of the invention further comprises a siloxane surfactant present in an amount greater than 0.1% by weight of the ink composition.

A siloxane surfactant is a surfactant having a siloxane functional group (i.e. an Si—O—Si linkage).

Preferably, the siloxane surfactant is a polyether modified siloxane surfactant.

Preferably, the siloxane surfactant is present in less than 4.0 wt % based on total weight of the ink composition, more preferably less than 3.0 wt % and even more preferably less than 2.5 wt %. The siloxane surfactant is present in greater than 0.1 wt % based on total weight of the ink composition, preferably greater than 0.2 wt %, preferably greater than 0.3 wt %, preferably greater than 0.5 wt %, preferably greater than 0.7 wt %, and even more preferably greater than 0.9 wt %. Preferably, the siloxane surfactant is present at about 1.0 wt % based on the total weight of the ink composition. The siloxane surfactant may be present in an amount that is in a range with the upper and lower limits selected from the amounts described above.

Preferably the siloxane surfactant has a viscosity of about 100 to 3000 mPa·s, more preferably from 500 to 2500 mPa·s, more preferably from 1000 to 2500 mPa·s, and even more preferably from 1500 to 2500 mPa·s at 25° C. Preferably the siloxane surfactant has a viscosity of less than 3000 mPa·s, more preferably less than 2000 mPa·s at 25° C. Preferably the siloxane surfactant has a viscosity of greater than 100 mPa·s, more preferably greater than 500 mPa·s, more preferably greater than 1000 mPa·s, more preferably greater than 1500 mPa·s, even more preferably greater than 1700 mPa·s at 25° C. The viscosity of the siloxane surfactant may be in a range with the upper and lower limits selected from the amounts described above. The viscosity of the siloxane surfactant may be measured using a viscometer such as a Brookfield DV-II+ viscometer.

In some cases, a siloxane surfactant is obtained pre-diluted in a solvent. The viscosity of the siloxane surfactant may refer to the viscosity of the pre-diluted solution or to the siloxane surfactant before dilution. Preferably, the viscosity refers to the siloxane surfactant before dilution, i.e. the viscosity is the viscosity of the siloxane surfactant per se.

Solvents

The liquid carrier of the ink composition of the first aspect of the invention may comprise an organic solvent or a mixture of organic solvents. Any organic solvent or mixture which can dissolve the colorant is suitable. A solvent may be selected from ketones, alcohols, esters, glycols, glycol ethers, carbonates or a mixture thereof.

For example, an organic solvent may be selected from acetone, methyl ethyl ketone, methyl propyl ketone, methyl isobutyl ketone, cyclohexanone, ethanol, isopropanol, n-propanol, isobutanol, n-butanol, sec-butanol, methyl acetate, ethyl acetate, n-propyl acetate, isopropyl acetate, n-butyl acetate, isobutyl acetate, t-butyl acetate, n-amyl acetate, isoamyl acetate, isobutyl isobutyrate, ethylene glycol, propylene glycol, 1-methoxy-2-propanol and 1-methoxy-2-propyl acetate, dimethyl carbonate or a mixture thereof.

Preferably, an organic solvent may be selected from acetone, methyl ethyl ketone, ethanol, methyl acetate and ethyl acetate or a mixture thereof. In particular, a combination of methyl ethyl ketone with ethanol, ethanol with ethyl acetate and/or methyl acetate, ethanol with 1-methoxy-2-propanol or acetone with methyl acetate may be used.

Preferably, the organic solvent or mixture of organic solvents is present in the composition between 10 to 95 wt %, more preferably 40 to 90 wt %, and most preferably 70 to 90 wt % by weight based on total weight of the ink composition.

Preferably, the organic solvent or mixture of organic solvents is present in less than 95 wt % based on total weight of the ink composition, more preferably less than 90 wt % and even more preferably less than 85 wt %. Preferably, the solvent is present in greater than 10 wt % based on total weight of the ink composition, preferably greater than 40 wt %, and even more preferably greater than 70 wt %. The solvent may be present in an amount that is in a range with the upper and lower limits selected from the amounts described above.

A preferred organic solvent for use is a ketone, such as methyl ethyl ketone. Preferably, the ketone, such as methyl ethyl ketone, is present from 10 to 90 wt %, more preferably 60 to 87 wt %, and most preferably 75 to 85 wt % based on total weight of the ink composition.

Preferably, the ketone, such as methyl ethyl ketone, is present in less than 90 wt % based on total weight of the ink composition, more preferably less than 87 wt % and even more preferably less than 85 wt %. Preferably, the ketone, such as methyl ethyl ketone, is present in greater than 10 wt % based on total weight of the ink composition, preferably greater than 60 wt %, and even more preferably greater than 75 wt %. The ketone may be present in an amount that is in a range with the upper and lower limits selected from the amounts described above.

When the organic solvent is a mixture, the mixture preferably comprises a ketone with an alcohol such as a $C_{1-6}$ alkyl alcohol or an ester with an alcohol or a ketone with an ester. The alcohol may be a $C_{1-6}$ alkyl alcohol such as isopropanol or ethanol, preferably ethanol. The ester may be a $C_{1-6}$ alkyl $C_{1-6}$ alkanoate such as ethyl acetate or methyl acetate. The ketone may be a $C_{1-6}$ alkyl- a $C_{1-6}$ alkyl ketone, for example acetone or methyl ethyl ketone (MEK).

Preferred mixtures comprise methyl ethyl ketone and ethanol or isopropanol, such as ethanol. In this case, preferably methyl ethyl ketone, is present in less than 90 wt % based on total weight of the ink composition, more preferably less than 80 wt % and even more preferably less than 70 wt %. Preferably, methyl ethyl ketone, is present in greater than 10 wt % based on total weight of the ink composition, preferably greater than 45 wt %, and even more preferably greater than 55 wt %. In this case, preferably, the alcohol is present from 5 to 20 wt %, more preferably 10 to 15 wt %, based on total weight of the ink composition. Preferably, the alcohol is present in less than 20 wt % based on total weight of the ink composition, more preferably less than 15 wt %. Preferably, the alcohol is present in greater than 5 wt % based on total weight of the ink composition, preferably greater than 10 wt %. The methyl ethyl ketone and alcohol may be present in an amount that is in a range with the upper and lower limits selected from the amounts described above.

Preferred mixtures comprise acetone with methyl acetate and/or ethyl acetate, such as methyl acetate and ethyl acetate. In this case, preferably acetone, is present in less than 80 wt % based on total weight of the ink composition, more preferably less than 60 wt % and even more preferably less than 50 wt %. Preferably, acetone, is present in greater than 10 wt % based on total weight of the ink composition, preferably greater than 30 wt %, and even more preferably greater than 40 wt %. In this case, preferably, the ester(s) is present from 5 to 40 wt %, more preferably 10 to 30 wt %, based on total weight of the ink composition. Preferably, the ester(s) is present in less than 30 wt % based on total weight of the ink composition, more preferably less than 25 wt %. Preferably, the ester(s) is present in greater than 5 wt % based on total weight of the ink composition, preferably greater than 15 wt %. The acetone and ester(s) may be present in an amount that is in a range with the upper and lower limits selected from the amounts described above.

Preferred mixtures comprise an alcohol, such as ethanol, with methyl acetate or ethyl acetate, such as ethyl acetate. In this case, preferably the alcohol, such as ethanol, is present in less than 70 wt % based on total weight of the ink composition, more preferably less than 50 wt % and even more preferably less than 40 wt %. Preferably, the alcohol, such as ethanol, is present in greater than 10 wt % based on total weight of the ink composition, preferably greater than 20 wt %, and even more preferably greater than 30 wt %. In this case, preferably, the ester is present from 10 to 70 wt %, more preferably 20 to 50 wt %, based on total weight of the ink composition. Preferably, the ester is present in less than 60 wt % based on total weight of the ink composition, more preferably less than 40 wt %. Preferably, the ester is present in greater than 20 wt % based on total weight of the ink composition, preferably greater than 30 wt %. The alcohol and ester may be present in an amount that is in a range with the upper and lower limits selected from the amounts described above.

Preferred mixtures comprise acetone with an alcohol such as ethanol. In this case, preferably acetone, is present in less than 80 wt % based on total weight of the ink composition, more preferably less than 60 wt % and even more preferably less than 50 wt %. Preferably, acetone, is present in greater than 10 wt % based on total weight of the ink composition, preferably greater than 30 wt %, and even more preferably greater than 40 wt %. In this case, preferably, the alcohol is present from 5 to 40 wt %, more preferably 10 to 30 wt %, based on total weight of the ink composition. Preferably, the alcohol is present in less than 30 wt % based on total weight of the ink composition, more preferably less than 25 wt %. Preferably, the alcohol is present in greater than 5 wt % based on total weight of the ink composition, preferably greater than 15 wt %. The acetone and alcohol may be present in an amount that is in a range with the upper and lower limits selected from the amounts described above.

The ink composition is preferably a non-aqueous composition.

The ink composition may also contain water. For example, if present, water may be present at 10 wt % or less based on the total weight of the ink composition, and preferably water is present at 5 wt % or less.

In the printed deposit the liquid carrier or at least a component of the liquid carrier will have at least partially evaporated. In this case, it may be that no liquid carrier or only trace amounts of liquid carrier are present in the printed deposit.

Binders

A binder, such as a binder resin, may be present in the inkjet composition of the first aspect.

The binder comprises one or more polymers. The binder may be selected from any suitable binder, for example, suitable binders include polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins and mixtures of two or more thereof.

Preferably, the binder is selected from cellulosic resins, acrylic resins, vinyl resins, polyamides, polyesters, polyvinyl (e.g. polyvinyl butyral (PVB)), and polyurethanes. More preferably, the binder is a cellulosic resin. Even more preferably, the cellulosic resin is cellulose acetate butyrate.

Preferably, the binder has a molecular weight, such as a weight average molecular weight (Mw) between 500 and 50,000, more preferably between 1,500 and 50,000, more preferably between 10,000 and 50,000 and even more preferably between 15,000 and 50,000. Preferably, the binder has a molecular weight, such as a weight average molecular weight (Mw) of at least 500, more preferably at least 1,500, more preferably at least 10,000 and even more preferably at least 15,000. Preferably, the binder has a molecular weight, such as a weight average molecular weight (Mw) less than 50,000. The binder has a molecular weight, such as a weight average molecular weight (Mw) that is in a range with the upper and lower limits selected from the amounts described above.

In the ink compositions described below the cellulose binder resin CAB-551-0.1 is used. CAB-551-0.1 is shortened to CAB551 in the following description. In the ink compositions described below the binder Foralyn 110 is used. Foralyn 110 is also referred to as 'Foralyn' in the following description.

Second Aspect

In the second aspect, the invention provides an ink composition having a liquid carrier and carbon black. The ink composition has a surface resistance of at least 2 MΩ/sq after washing the printed deposit with the liquid carrier and an adhesion of 50% or more after applying an adhesive tape to the printed deposit and removing the adhesive tape.

The ink composition may be an inkjet ink composition such as a continuous inkjet ink.

In this way, the ink composition of the second aspect provides an ink with reduced printer error and good print quality.

The present inventors have surprisingly found that the build-up of ink on the charge electrode is not substantially responsible for the problem of shorting and hence printer error. The inventors have found that the ink when dried may not be conductive. Washing of the charge electrode, and other printer components, is routinely carried out in order to increase printer reliability. The inventors have unexpectedly found that the problem of shorting for such inks occurs after the charge electrodes are washed to remove residual ink.

It is proposed that the problem of electrical shorting occurs when the other components of the ink such as the binders and the like are removed by washing, leaving behind the carbon black.

The ink of the present invention solves this problem by providing an ink with a high surface resistance after washing. In some cases, the substantial absence of a cross linker in the ink composition may be used to achieve this surface resistance.

It is proposed that when the ink deposits formed by the inks of the present invention are washed, the binder and other ink components are solubilised and are able to contribute to wetting and removing the carbon black. This means that the carbon black is also removed from the charge electrode by washing in the inks of the present invention.

The inks of the present invention also provide sufficient adhesion in particular on low surface energy substrates. For example, the adhesion may be controlled by the selection of binder, tackifier, salt and optionally surfactant. In some cases, if a metallic conductivity salt is used, a silicon-surfactant may be selected to give the appropriate adhesion. In some cases, an organic conductivity salt is used and a silicon-surfactant is not needed to give the desired adhesion.

Some of the inks of the first aspect of the invention are also inks of the second aspect of the invention. For example, the example ink compositions 1, 25 and 28 in the Examples section are each ink compositions of the first aspect and also ink compositions of the second aspect of the invention.

In some embodiments the ink composition of the second aspect comprises a binder selected from an acrylic resin or a rosin ester resin.

In some embodiments the inks composition of the second aspect comprises a tackifier in less than 2.5 wt %. The tackifier may be a terpene phenolic resin and/or an ester of hydrogenated rosin. Preferably the tackifier is a terpene phenolic resin.

Preferably the ink compositions described herein have a viscosity of about 0.5 to 8 mPa·s, more preferably from 1 to 6.5 mPa·s and even more preferably from 2 to 5.5 mPa·s at 25° C. Preferably the ink compositions described herein have a viscosity of less than 7 mPa·s, more preferably less than 5.5 mPa·s at 25° C. Preferably the ink compositions described herein have a viscosity of greater than 0.5 mPa·s, more preferably greater than 1 mPa·s, even more preferably greater than 3 mPa·s at 25° C. The viscosity of the ink compositions may be in a range with the upper and lower limits selected from the amounts described above. The viscosity of the ink composition may be measured using a viscometer such as a Brookfield DV-II+ viscometer.

Preferably the ink compositions as described herein have a static surface tension of from 20 to 50 mN/m, more preferably from 20 to 40 mN/m at 25° C., most preferably from 20 to 30 mN/m. The static surface tension of the composition may be measured using equipment such as a du Nouy ring tensiometer or using the pendant drop method on a KSV Cam 200 optical tensiometer. The static surface tension of the ink composition may alternatively be measured using a bubble pressure tensiometer, such as a SITA pro line t15.

Some of the ink compositions of the first aspect are also ink compositions of the second aspect.

Surface Resistance

The printed deposit of the ink composition of the second aspect has a surface resistance of at least 2 MΩ/sq after washing the printed deposit with the liquid carrier.

In some cases, the surface resistance of the printed deposit after washing with the liquid carrier may be at least 4

MΩ/sq, preferably at least 6 MΩ/sq, preferably at least 10 MΩ/sq and even more preferably at least 12 MΩ/sq.

The term surface resistance may be used interchangeably with sheet resistance or surface resistivity in the art.

Surface resistance is a measure of resistance of thin films that are nominally uniform in thickness. Specifically, the term surface resistance refers to the ratio of a DC voltage to the current flowing between two electrodes of specified configuration that are in contact with the same side of a material under test.

Surface resistance, $R_s$, can be determined by measuring the resistance of a sample of the material under test between a pair of electrodes and applying the following equation:

$$R_s = R_{measured} * (W/L)$$

$R_{measured}$ is the measured resistance, L is the length of the sample of the material under test between the electrodes, i.e., the separation of the electrodes, and W is the width of the electrodes in the direction perpendicular to the direction of current flow between the electrodes.

Although dimensionally the unit of surface resistance is Ohms, conventionally, and in this specification, the unit Ω/sq is used to denote surface resistance.

Surface resistance of the ink composition may be measured by any suitable means. For example, the surface resistance may be measured using a 4 point probe or a 2 point probe (e.g. a multimeter).

It is common to measure surface resistance of materials with low surface resistance using a 4 point probe to calibrate for lead and contact resistance from the measurement. It is known that the 4 point probe is typically required for measurement of films with relatively low surface resistance such as when measuring surface resistance of a conductor film or semi-conductor film. For the present case the films have relatively high surface resistance. In cases of high surface resistance, a 2 point probe is sufficient to measure the surface resistance.

The surface resistance of a deposit of the ink composition formed on a substrate and allowed to dry may be measured. The deposit may be a draw down.

A drawdown is a sample made by depositing a layer of the mixed ink on the surface of a substrate using a smooth-edged knife or drawdown bar or rod. A drawdown bar can be used to provide a specified ink thickness on the substrate. In the worked examples of the present case a 100 μm drawdown rod (or drawdown bar) is used to provide an ink thickness of approximately 100 μm. Drawdowns are often used to mimic large printed areas.

The dried deposit may be washed with the liquid carrier, for example, may be washed by submerging the substrate in the liquid carrier. The washing step may be carried out more than once, for example 3 or more times such as 5 times. Electrodes may then be attached to the deposit with a portion of the deposit between the electrodes. The electrodes may, for example, be formed by depositing a conductive paint such as a conductive silver paint. The distance between the electrodes is measured, in some cases the distance between the electrodes is 0.5 cm. The width of the electrodes i.e. the dimension of the electrodes defining the width of the portion of the deposit under test is measured, in some cases the width is 1.3 cm. Surface resistance of the printed deposit may be determined by attaching an ohmmeter to the electrodes, measuring the resistance and multiplying the measured resistance by the ratio of the width of the electrodes to the distance between the electrodes. For example, the ohmmeter may be a digital multimeter such as a Fluke 117 True RMS digital multimeter, from Fluke Corporation.

In one particular example, a drawdown on a ceramic material, for example a MACOR machinable glass ceramic sheet, may be made using a 100 μm k-bar and the drawdown may be allowed to dry, for example for around 30 minutes in a 70° C. oven. The drawdown may then be washed by soaking the ceramic material in the liquid carrier for around 5 minutes. The ceramic material may be submerged in clean liquid carrier and moved around. This step may be repeated until the final liquid carrier remains clear, for example, this step may be repeated 5 times. Silver conductive paint, for example from Electrolube, with a silver content of 45% may be used to paint conductive electrodes on the surface of the washed ceramic with a portion of the ink drawdown between the conductive electrodes. Each electrode may be confirmed to have a resistance of less than 10Ω. The electrodes may be 0.5 cm apart with the ink deposit between the electrodes. The width of the electrodes i.e. the dimension of the electrodes defining the width of the portion of the deposit under test is measured, in some cases the width is 1.3 cm. The surface resistance of the printed ink may be determined by attaching an ohmmeter to the electrodes and measuring the resistance. For example, the ohmmeter may be a digital multimeter such as a Fluke 117 True RMS digital multimeter, from Fluke Corporation.

Adhesion

The printed deposit of the ink composition of the second aspect has an adhesion of 50% or more measured after applying an adhesive tape to the printed deposit and removing the adhesive tape.

It is proposed that the combination of binder, tackifier, salt and optionally surfactant provide inks with the adhesion properties claimed. For example, if a metallic salt is used for conductivity it may be important to use a silicon surfactant in order to provide the adhesion claimed. If an organic salt is used, a silicon surfactant is not required to give the adhesion claimed.

In some cases, the printed deposit of the ink composition of the second aspect has an adhesion of 60% or more, preferably 70% or more, preferably 80% or more and even more preferably 90% or more measured after applying an adhesive tape to the printed deposit and removing the adhesive tape.

In some cases, the adhesion may be measured by forming a deposit of the ink composition on a substrate and allowing the ink to dry. The substrate may be any suitable substrate, for example HDPE, Perspex, PET, polycarbonate, polystyrene of polypropylene, preferably the substrate is HDPE such as a 1.5 mm HDPE 300 sheet or PET such as 1.5 mm Veralite 100 A-PET. The deposit may be a drawdown. Drawdowns are discussed above.

After drying, any suitable adhesive tape may be applied to the substrate over the printed deposit. The adhesive tape may be a Scotch grade 810 or ISO 2409 Adhesive Tape supplied by Elcometer. The tape is subsequently removed from the substrate, for example by lifting and pulling the tape whilst holding the substrate in place. The adhesion of the ink after removal of the tape may be calculated using the following equations:

Percentage Adhesion=100−Percentage ink removed

Percentage ink removed=[(sum of areas before tape applied−sum of areas after tape removed)÷sum of areas before tape applied]×100.

The area of the printed deposit before and after tape adhesion may be measured by comparing photographic images of the deposit using Matlab. The Matlab method may be the method discussed below in the Examples section or any suitable variation thereof.

Carbon Black

The ink composition of the second aspect contains carbon black. The carbon black may be provided as a solid (e.g. powder or bead) or a dispersion formulation (e.g. a dispersion in a solvent).

In some cases, the carbon black is present in the ink composition at between 1 to 25 wt % based on total weight of the ink composition, more preferably 1.3 to 15 wt %, and most preferably 2 to 7 wt % based on total weight of the ink composition.

Preferably, the carbon black is present in less than 25 wt % based on total weight of the ink composition, more preferably less than 15 wt %, more preferably less than 6 wt % and even more preferably less than 4 wt %. Preferably, the carbon black is present in greater than 1 wt % based on total weight of the ink composition, preferably greater than 1.3 wt %, and even more preferably greater than 2 wt %. The carbon black may be present in an amount that is in a range with the upper and lower limits selected from the amounts described above.

Carbon black may be produced by the incomplete combustion of heavy petroleum products such as FCC tar, coal tar, ethylene cracking tar or by charring organic materials such as wood or bone. Carbon black may be a form of paracrystalline carbon that has a high surface-area-to-volume ratio. Carbon black may contain oxygen complexes (e.g. carboxylic, quinonic, lactonic, phenolic groups and others) absorbed onto the surface of the carbon. In some cases carbon black may be acid-oxidized by spraying acid onto the carbon during the manufacturing process to change the inherent surface chemistry. The amount of chemically-bonded oxygen on the surface area of the carbon black can be increased to enhance performance characteristics.

Carbon blacks suitable for the ink composition of the invention include carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 250R, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; carbon blacks manufactured by Orion, for example, Printex 45, Printex 35, Printex nature, Special Black 350, Special Black 535, Printex 3, Printex 30, Special Black 275; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

In some embodiments, carbon black is the only colourant in the ink. For example, the ink has substantially no further colourant components, preferably the ink has less than 0.1 wt % of further colourant compounds based on the total weight of the composition.

Cross-Linker

The ink composition of the second aspect may be substantially free of any cross-linker.

In this way, the present invention provides an ink that has a high surface resistance after washing and maintains good adhesion.

In the substantial absence of a cross linker, when the ink composition dries the binder and other components will form a film in the usual way. It is proposed that when this ink deposit is washed, the substantial absence of a cross-linker means that the binder and other ink components are solubilised and are themselves free (i.e. not cross-linked) to contribute to wetting the carbon black. This means that the carbon black is also removed from the charge electrode by washing.

The term cross-linker used in this context refers to species that can that can form a crosslink between components of the ink such as between polymers of a binder. Typically a cross-linker is designed to crosslink the binder, which frequently contain crosslinkable groups such as —OH, —COOH. Other components in the ink may have crosslinkable groups and can also be linked. The steric hindrance, accessibility and concentration of crosslinkable groups on a component will determine how much cross linking occurs with that component. Some crosslinking may occur in the liquid ink, however, typically crosslinking occurs only when the solvent evaporates.

In particular, the ink composition is substantially free of any crosslinker selected from metal crosslinkers, alkoxysilane crosslinkers, multifunction acrylate crosslinkers, acrylate oligomer crosslinkers, acrylated phosphoric acid crosslinkers, cationic UV curable epoxy monomer crosslinkers, isocyanate crosslinkers and amino resin crosslinkers combined. That is, the ink is substantially free of all of these crosslinkers, such as the ink composition has less than 1 wt % in total of these crosslinkers combined based on total weight of the ink composition.

The term alkoxysilane crosslinkers includes, for example, alkoxysilanes with an organic group for crosslinking, such as 3-aminopropyltrimethoxysilane or 3-aminopropyltriethoxysilane.

The term amino resin crosslinker includes, for example, melamine-formaldehyde resins, alkylated urea-formaldehyde resins, benzoguanamine, glycoluril, methylated melamine and butylated melamine.

The term multifunction acrylate crosslinkers includes, for example, polyethylene glycol dimethacrylate and diacrylate, allyl methacrylate.

The term acrylate oligomer crosslinkers includes, for example urethane acrylates, polyester acrylates, aminated acrylates and epoxyacrylates.

The term acrylated phosphoric acid crosslinkers, includes, for example, methacrylated phosphate esters. Suitable methacrylated phosphate esters are commercially available as Genorad 40 and Genorad 41 from RAHN USA Corp.

The term cationic UV curable epoxy monomer crosslinkers, includes, for example, cycloaliphatic epoxy base resins. Suitable cycloaliphatic epoxy base resins are commercially available as Uvi-Cute S105 and Uvi-Cure S128, commercially available from Lambson Group Ltd.

The term isocyanate crosslinkers includes, for example, TDI (toluene diisocyante), IPDI (Isophorone diisocyanate), MDI (Methylene diphenyl diisocyanate); or oligomeric isocyanates. Suitable oligomeric isocyanate are commercially available from Coverstro (formerly Bayer) under the Brand Desmodur, for example Desmodur N100, Desmodur N3300 and Desmodur Z4470.

The term metal crosslinkers includes, for example, any titanium or zirconium containing species, in particular any Ti(IV) or Zr(IV) containing species.

The metal crosslinker may be a metal ligand complex, for example a metal cation with an organic ligand.

In some cases, the ink composition is substantially free of a metal ligand complex. For example, the ink composition is substantially free of a metal ligand complex wherein the ligand of the metal ligand complex is an organic ligand such as an alkylcarboxylate. Preferably, the metal of the metal ligand complex is a metal cation, such as Ti(IV) or Zr(IV).

For example, the ink composition is substantially free of any metal crosslinker agent selected from titanium acetylacetonate, titanium butylphosphate, titanium triethanolamine, titanium lactate, zirconium diethylcitrate, zirconium acetate, and zirconium propionate. In particular, the ink composition is substantially free of zirconium propionate.

The term substantially free used in this context refers inks having less than 3 wt % of a crosslinker, preferably less than 1 wt %, preferably less than 0.5 wt %, preferably less than 0.1 wt % and more preferably less than 0.01 wt % of a crosslinker Surfactant The ink composition of the second aspect may comprise a surfactant. Preferably, the inkjet ink composition and/or the printed deposit further comprises a surfactant.

Suitable surfactants include anionic, cationic or non-ionic surfactants and mixtures of two or more thereof. Non-limiting examples of anionic surfactants include alkyl sulphate, alkylaryl sulfonate, dialkyl sulfonate, dialkyl sulphosuccinate, alkyl phosphate and polyoxyethylene alkyl ether sulphate. Non-limiting examples of cationic surfactants include alkylamine salt, ammonium salt, alkylpyridinium salt and alkylimidazolium salt. Non-limiting examples of non-ionic surfactants include polyoxyethylene alkyl ether, polyoxyethylene alkylaryl ether, sorbitan fatty acid ester, polyoxyethylene sorbitan fatty acid ester, polyoxyethylene sorbitol fatty acid ester, glycerine fatty acid ester, a fluorine-containing non-ionic surfactant and a silicon-containing non-ionic surfactant such as a siloxane surfactant. Mixtures of two or more surfactants may be used.

The ink composition may comprise up to 5% by weight of surfactant based on the total weight of the composition. More preferably, the ink composition comprises up to 1.5 wt % of surfactant based on the total weight of the composition.

Preferably, the ink composition of the present invention comprises a siloxane surfactant.

A siloxane surfactant is a surfactant having a siloxane functional group (i.e. an Si—O—Si linkage).

Preferably, the siloxane surfactant is a polyether modified siloxane surfactant.

Preferably, the siloxane surfactant is present in less than 4.0 wt % based on total weight of the ink composition, more preferably less than 3.0 wt % and even more preferably less than 2.5 wt %. The siloxane surfactant is present in greater than 0.1 wt % based on total weight of the ink composition, preferably greater than 0.2 wt %, preferably greater than 0.3 wt %, preferably greater than 0.5 wt %, preferably greater than 0.7 wt %, and even more preferably greater than 0.9 wt %. Preferably, the siloxane surfactant is present at about 1.0 wt % based on the total weight of the ink composition. The siloxane surfactant may be present in an amount that is in a range with the upper and lower limits selected from the amounts described above.

Preferably the siloxane surfactant has a viscosity of about 100 to 3000 mPa·s, more preferably from 500 to 2500 mPa·s, more preferably from 1000 to 2500 mPa·s, and even more preferably from 1500 to 2500 mPa·s at 25° C. Preferably the siloxane surfactant has a viscosity of less than 3000 mPa·s, more preferably less than 2000 mPa·s at 25° C. Preferably the siloxane surfactant has a viscosity of greater than 100 mPa·s, more preferably greater than 500 mPa·s, more preferably greater than 1000 mPa·s, more preferably greater than 1500 mPa·s, even more preferably greater than 1700 mPa·s at 25° C. The viscosity of the siloxane surfactant may be in a range with the upper and lower limits selected from the amounts described above. The viscosity of the siloxane surfactant may be measured using a viscometer such as a Brookfield DV-II+ viscometer.

In some cases, a siloxane surfactant is obtained pre-diluted in a solvent. The viscosity of the siloxane surfactant may refer to the viscosity of the pre-diluted solution or to the siloxane surfactant before dilution. Preferably, the viscosity refers to the siloxane surfactant before dilution, i.e. the viscosity is the viscosity of the siloxane surfactant per se.

Conductivity Salt

The ink composition and the printed deposit of the second aspect of the invention may comprise a conductivity salt.

Salts are composed of related numbers of cations (positively charged ions) and anions (negatively charged ions) so that the product is electrically neutral (without a net charge). In some cases, the conductivity salt may be a metal conductivity salt or an organic conductivity salt.

A metal conductivity salt is a salt in which the cation is a metal cation. The metal cation may be a group 1 metal ion (alkali metal ion), such as a cation selected from potassium, lithium or sodium cations. Preferably, the metal cation is a potassium or lithium cation.

In some cases where a metal conductivity salt is present, a silicon surfactant is also present, preferably a siloxane surfactant.

An organic conductivity salt is a salt in which the cation is an organic cation such as a phosphonium or ammonium cation. Preferably the organic cation is an ammonium cation for example, a tetraalkyl ammonium cation such as a tetrabutyl ammonium or tetraethyl ammonium cation.

The anion may be any suitable anion, for example it may be an organic or an inorganic anion, it may be a monoatomic or polyatomic anion. The anion may be selected from $PF_6^-$, $CN^-$, $Cl^-$, $F^-$, $I^-$, $Br^-$, $SCN^-$, $C_6H_7O_2^-$, $CF_3SO_3^-$ or $NO_3^-$. Preferably, the anion is $PF_6^-$ $NO_3^-$, or $Br^-$.

The conductivity salt may be selected from lithium nitrate, lithium triflate, potassium hexafluorophosphate, sodium hexafluorophosphate, potassium sorbate, potassium thiocyanate, tetrabutylammonium hexafluorophosphate, tetrabutylammonium bromide, sodium thiocyanate, sodium iodide, potassium iodide, tetraethylammonium chloride, tetraethylammonium bromide, tetrabutylammonium chloride, tetrabutylammonium bromide, tetrabutylammonium acetate, tetrabutylammonium nitrate, tetrabutylammonium tetrafluoroborate, tetrabutylammonium hexafluorophosphate, tetrabutylphosphonium chloride and tetrabutylphosphonium bromide.

In some cases, the conductivity salt is potassium hexafluorophosphate, tetrabutylammonium hexafluorophosphate, tetrabutylammonium bromide or lithium nitrate. In some cases, the conductivity salt is tetrabutylammonium hexafluorophosphate, tetrabutylammonium bromide or lithium nitrate.

Preferably, the conductivity salt is present at 4.0 wt % or less based on total weight of the ink composition, more preferably 2.0 wt % or less and even more preferably 1.5 wt % or less. Preferably, the conductivity salt is present at 0.3 wt % or more based on total weight of the ink composition, preferably 0.5 wt % or more, and even more preferably 0.8 wt % or more. The conductivity salt may be present in an amount that is in a range with the upper and lower limits selected from the amounts described above. For example, the conductivity salt is present at 0.3 to 4.0 wt % based on total weight of the ink composition.

Preferably, the conductivity salt is present in an amount that provides an ink composition with a conductivity of less than 2200 µS/cm, more preferably less than 1900 µS/cm and even more preferably less than 1500 µS/cm. Preferably, the conductivity salt is present in an amount that provides an ink composition with a conductivity greater than 200 µS/cm, preferably greater than 500 µS/cm, preferably greater than 800 µS/cm, and even more preferably greater than 1200 µS/cm. The conductivity salt may be present in an amount to give a conductivity that is in a range with the upper and lower limits selected from the amounts described above. For example, the ink composition has a conductivity of from 500 to 2200 µS/cm.

Conductivity may be measured using an EDT Series 3 BA 380 conductivity meter using an EDT E8070 Polymer Conductivity Cell probe, with the sample warmed by a water bath at a temperature of 25° C.

Solvents

The liquid carrier of the ink composition of the first or second aspect of the invention may comprise an organic solvent or a mixture of organic solvents. Any organic solvent or mixture which can solubilise the ink components is suitable. A solvent may be selected from ketones, alcohols, esters, glycols, glycol ethers, carbonates or a mixture thereof.

For example, an organic solvent may be selected from acetone, methyl ethyl ketone, methyl propyl ketone, methyl isobutyl ketone, cyclohexanone, ethanol, isopropanol, n-propanol, isobutanol, n-butanol, sec-butanol, methyl acetate, ethyl acetate, n-propyl acetate, isopropyl acetate, n-butyl acetate, isobutyl acetate, t-butyl acetate, n-amyl acetate, isoamyl acetate, isobutyl isobutyrate, ethylene glycol, propylene glycol, 1-methoxy-2-propanol and 1-methoxy-2-propyl acetate, dimethyl carbonate or a mixture thereof.

Preferably, an organic solvent may be selected from acetone, methyl ethyl ketone, ethanol, methyl acetate, 1-methoxy-2-propanol and ethyl acetate or a mixture thereof. In particular, a combination of methyl ethyl ketone with ethanol, ethanol with ethyl acetate and/or methyl acetate, ethanol with 1-methoxy-2-propanol or acetone with methyl acetate may be used. Preferably a combination of methyl ethyl ketone with ethanol or ethanol with 1-methoxy-2-propanol may be used.

Preferably, the organic solvent or mixture of organic solvents is present in the composition between 10 to 95 wt %, more preferably 40 to 90 wt %, and most preferably 70 to 90 wt % by weight based on total weight of the ink composition.

Preferably, the organic solvent or mixture of organic solvents is present in less than 95 wt % based on total weight of the ink composition, more preferably less than 90 wt % and even more preferably less than 85 wt %. Preferably, the solvent is present in greater than 10 wt % based on total weight of the ink composition, preferably greater than 40 wt %, and even more preferably greater than 70 wt %. The solvent may be present in an amount that is in a range with the upper and lower limits selected from the amounts described above.

A preferred organic solvent for use is a ketone, such as methyl ethyl ketone. Preferably, the ketone, such as methyl ethyl ketone, is present from 10 to 90 wt %, more preferably 60 to 85 wt %, and most preferably 65 to 80 wt % based on total weight of the ink composition.

Preferably, the ketone, such as methyl ethyl ketone, is present in less than 90 wt % based on total weight of the ink composition, more preferably less than 85 wt % and even more preferably less than 80 wt %. Preferably, the ketone, such as methyl ethyl ketone, is present in greater than 10 wt % based on total weight of the ink composition, preferably greater than 60 wt %, and even more preferably greater than 65 wt %. The ketone may be present in an amount that is in a range with the upper and lower limits selected from the amounts described above.

When the organic solvent is a mixture, the mixture preferably comprises a ketone with an alcohol such as a $C_{1-6}$ alkyl alcohol or an ester with an alcohol or a ketone with an ester. The alcohol may be a $C_{1-6}$ alkyl alcohol such as isopropanol or ethanol, preferably ethanol. The ester may be a $C_{1-6}$ alkyl $C_{1-6}$ alkanoate such as ethyl acetate or methyl acetate. The ketone may be a $C_{1-6}$ alkyl- a $C_{1-6}$ alkyl ketone, for example acetone or methyl ethyl ketone (MEK).

Preferred mixtures comprise methyl ethyl ketone and ethanol or isopropanol, such as ethanol. In this case, preferably methyl ethyl ketone, is present in less than 90 wt % based on total weight of the ink composition, more preferably less than 80 wt % and even more preferably less than 70 wt %. Preferably, methyl ethyl ketone, is present in greater than 10 wt % based on total weight of the ink composition, preferably greater than 45 wt %, and even more preferably greater than 55 wt %. In this case, preferably, the alcohol is present from 5 to 20 wt %, more preferably 10 to 15 wt %, based on total weight of the ink composition. Preferably, the alcohol is present in less than 20 wt % based on total weight of the ink composition, more preferably less than 15 wt %. Preferably, the alcohol is present in greater than 5 wt % based on total weight of the ink composition, preferably greater than 8 wt %. The methyl ethyl ketone and alcohol may be present in an amount that is in a range with the upper and lower limits selected from the amounts described above.

Preferred mixtures comprise ethanol and 1-methoxy-2-propanol. In this case, preferably ethanol, is present in less than 70 wt % based on total weight of the ink composition, more preferably less than 50 wt % and even more preferably less than 40 wt %. Preferably, ethanol, is present in greater than 10 wt % based on total weight of the ink composition, preferably greater than 25 wt %, and even more preferably greater than 30 wt %. In this case, preferably, 1-methoxy-2-propanol is present from 20 to 50 wt %, more preferably 40 to 45 wt %, based on total weight of the ink composition. Preferably, the 1-methoxy-2-propanol is present in less than 70 wt % based on total weight of the ink composition, more preferably less than 50 wt %. Preferably, 1-methoxy-2-propanol is present in greater than 20 wt % based on total weight of the ink composition, preferably greater than 35 wt %. The ethanol and 1-methoxy-2-propanol may be present in an amount that is in a range with the upper and lower limits selected from the amounts described above.

Preferred mixtures comprise an alcohol, such as ethanol, with methyl acetate or ethyl acetate, such as ethyl acetate. In this case, preferably the alcohol, such as ethanol, is present in less than 40 wt % based on total weight of the ink composition, more preferably less than 20 wt % and even more preferably less than 15 wt %. Preferably, the alcohol, such as ethanol, is present in greater than 1 wt % based on total weight of the ink composition, preferably greater than 2 wt %, and even more preferably greater than 30 wt %. In this case, preferably, the ester is present from 10 to 70 wt %, more preferably 20 to 50 wt %, based on total weight of the ink composition. Preferably, the ester is present in less than 60 wt % based on total weight of the ink composition, more preferably less than 40 wt %. Preferably, the ester is present in greater than 20 wt % based on total weight of the ink composition, preferably greater than 30 wt %. The alcohol and ester may be present in an amount that is in a range with the upper and lower limits selected from the amounts described above.

Preferred mixtures comprise acetone with an alcohol such as ethanol. In this case, preferably acetone, is present in less than 80 wt % based on total weight of the ink composition, more preferably less than 60 wt % and even more preferably less than 50 wt %. Preferably, acetone, is present in greater than 10 wt % based on total weight of the ink composition, preferably greater than 30 wt %, and even more preferably greater than 40 wt %. In this case, preferably, the alcohol is present from 5 to 40 wt %, more preferably 10 to 30 wt %, based on total weight of the ink composition. Preferably, the alcohol is present in less than 30 wt % based on total weight of the ink composition, more preferably less than 25 wt %. Preferably, the alcohol is present in greater than 5 wt % based on total weight of the ink composition, preferably greater than 15 wt %. The acetone and alcohol may be present in an amount that is in a range with the upper and lower limits selected from the amounts described above.

The ink composition is preferably a non-aqueous composition.

The ink composition may also contain water. For example, if present, water may be present at 10 wt % or less based on the total weight of the ink composition, and preferably water is present at 5 wt % or less, and more preferably water is present at 1 wt % or less.

In the printed deposit the liquid carrier or at least a component of the liquid carrier will have at least partially evaporated. In this case, it may be that no liquid carrier or only trace amounts of liquid carrier are present in the printed deposit.

Binders

A binder, such as a binder resin, may be present in the inkjet composition.

The binder comprises one or more polymers. The binder may be selected from any suitable binder, for example, suitable binders include polyamide resins, polyurethane resins, rosin ester resins, acrylic resins, polyvinyl butyral resins, polyesters, phenolic resins, vinyl resins, polystyrene/polyacrylate copolymers, cellulose ethers, cellulose nitrate resins, polymaleic anhydrides, acetal polymers, polystyrene/polybutadiene copolymers, polystyrene/polymethacrylate copolymers, sulfonated polyesters, aldehyde resins, polyhydroxystyrene resins and polyketone resins and mixtures of two or more thereof.

Preferably, the binder is selected from cellulosic resins, acrylic resins, vinyl resins, polyamides, polyesters, polyvinyl (e.g. polyvinyl butyral (PVB)), and polyurethanes. More preferably, the binder is a cellulosic resin, a styrene acrylic resin, a rosin ester resin or a mixture thereof. In some cases, the binder comprises an acrylic resin or a rosin ester resin.

Preferably, the binder has a molecular weight, such as a weight average molecular weight (Mw) between 500 and 50,000, more preferably between 1,500 and 50,000, more preferably between 10,000 and 50,000 and even more preferably between 15,000 and 50,000. Preferably, the binder has a molecular weight, such as a weight average molecular weight (Mw) of at least 500, more preferably at least 1,500, more preferably at least 10,000 and even more preferably at least 15,000. Preferably, the binder has a molecular weight, such as a weight average molecular weight (Mw) less than 50,000. The binder has a molecular weight, such as a weight average molecular weight (Mw) that is in a range with the upper and lower limits selected from the amounts described above.

Preferably, the binder is present at 25 wt % or less based on total weight of the ink composition, more preferably 20 wt % or less and even more preferably 15 wt % or less. Preferably, the binder is present at 3 wt % or more based on total weight of the ink composition, preferably 5 wt % or more, preferably 8 wt % or more, and even more preferably 10 wt % or more. The binder may be present in an amount that is in a range with the upper and lower limits selected from the amounts described above. For example, the binder is present at 8 to 20 wt % based on total weight of the ink composition.

In the ink compositions described below the cellulose binder resin CAB-551-0.1 is used. CAB-551-0.1 is shortened to CAB551 in the following description. In the ink compositions described below the binder Foralyn 110 is used. Foralyn 110 is also referred to as 'Foralyn' in the following description.

Additives

The ink compositions of the first or second aspect and the printed deposit of the inks of the first and second aspect may contain additional components, such as those commonly used in the art.

For example, the ink composition and the printed deposit may further comprise one or more preservatives, humectants, additional surfactants, plasticizers, wetting agents, adhesion promotion additives, biocides and mixtures of two or more thereof.

Humectants

Preferably, the ink composition and the printed deposit further comprise a humectant.

Suitable humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol, dipropylene glycol, polypropylene glycol, glycerol, 1,2,6-hexanetriol, sorbitol, 2-pyrrolidone, 2-propanediol, butyrolacetone, tetrahydrofurfuryl alcohol and 1,2,4-butanetriol and mixtures of two or more thereof. Preferably the humectant is selected from a group consisting of glycerol, tetrahydrofurfuryl alcohol, polypropylene glycol and mixtures of two or more thereof.

Preservatives

Preferably, the ink composition and the printed deposit further comprise a preservative.

Suitable preservatives include sodium benzoate, benzoic acid, sorbic acid, potassium sorbate, calcium sorbate, calcium benzoate, methylparaben and mixtures of two or more thereof. The preferred preservative is sodium benzoate.

The ink composition may comprise up to 2% by weight of preservative based on the total weight of the composition. More preferably, the ink composition comprises up to 1% by weight of preservative based on the total weight of the composition.

Tackifier

Preferably, the inkjet ink composition and the printed deposit further comprise a tackifier.

In some cases the tackifier may be a binder; preferably, when the tackifier is a binder it is used in combination with a co-binder. In some cases, the tackifier is a non-film forming polymer. In some cases, the tackifier may be used in combination with other polymers to produce the desired properties.

Suitable tackifiers include resins such as rosins, terpenes and modified terpenes, aliphatic, cycloaliphatic and aromatic resins, terpene phenolic resins and silicone or mineral oils. Preferably the tackifiers are a terpene phenolic resin and/or an ester of hydrogenated rosin. Most preferably the tackifier is a terpene phenolic resin.

The ink composition may comprise from 0.3 to 10% by weight of tackifier based on the total weight of the composition. More preferably, the ink composition comprises from 1 to 5% by weight of tackifier based on the total weight of the composition.

Adhesion Promoter

Preferably, the inkjet ink composition and the printed deposit further comprise an adhesion promoter.

An adhesion promoter is a substance which acts to promote adhesion of the ink composition to a substrate.

Suitable adhesion promoters are titanium phosphate complex, titanium acetylacetonate, triethanolamine zirconate, zirconium citrate, zirconium propanoate, organosilicon, polyketones binders, polyesters binders, or a ketone condensation resin.

Preferably the adhesion promoter is a titanium phosphate complex or a ketone condensation resin. More preferably, the adhesion promoter is a ketone condensation resin.

Dispersant

Preferably, the ink composition and the printed deposit further comprise a pigment dispersant. Suitable dispersants include ionic and non-ionic dispersants. Preferably the dispersant is an acrylic block co-copolymer.

Types of Packaging

The invention further provides a method for printing images on a substrate comprising directing a stream of droplets of any of the embodiments of the ink composition of the invention onto the substrate and allowing the ink droplets to dry, thereby printing images on the substrate. Preferably, an inkjet printer such as a continuous inkjet printer is used in the method.

The ink composition of the present invention is particularly suitable for printing on non-porous substrates, in particular non-porous low surface energy substrates such as are typically used for food packaging.

Examples of such food packaging include aluminium or steel cans, and pots, retort pouches, and flexible films made from low density polyethylene (LDPE), high density polyethylene (HDPE), polypropylene (PP), PET, nylon or PVdC. Preferably, the substrate is a LDPE, HDPE or PP substrate.

Methods and Uses

The ink compositions are formulated by combining the components using methods known in the art.

The components of the ink composition may be combined by adding the components together and stirring using mechanical agitation. In some cases the components may be added in the following order: solvent, binder, surfactant, additional additives, colourant, dispersion and the conductivity salt.

The present disclosure further provides a method for printing images on a substrate in a continuous inkjet printer comprising directing a stream of droplets of any of the embodiments of the ink composition to a substrate and allowing the ink droplets to dry, thereby printing images on a substrate. Any suitable substrate may be printed in accordance with the invention.

Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc.

Preferably, the ink composition as described herein is suitable for coding and marking, in particular for coding and marking on food packaging. It is particularly preferred that the ink composition is useful for printing on plastic or paper wrappers of food or beverage products, for example for printing the expiration date on such packaging.

Advantageously, using the compositions and methods described herein overcomes and/or mitigates at least some of the problems described above, providing an improved quality print.

The invention further provides a printed article comprising an article on which a printed deposit has been formed using the ink composition of the invention.

Definitions

As used herein the term printed deposit refers to the ink composition after it has been printed onto a suitable substrate, and at least partially allowed to dry. That is, the ink composition of the present invention wherein at least some of the liquid carrier has evaporated.

An ink composition may be an inkjet ink composition suitable for use in inkjet printing. The ink composition is typically in the form of a liquid, and typically a solution.

The term $C_{1-6}$ alkyl alcohol refers to any solvent having at least one hydroxyl function group (—OH) and having between 1 and 6 carbon atoms.

A polymer is any substance having a repeat unit and includes: polysaccharides and their derivatives, for example cellulose and its derivatives; addition polymers such as acrylic resins or polyvinyl resins; condensation polymer, for example polyurethanes, polyamide and polyesters; and co-polymers wherein the repeat unit is formed of two or more different compounds, for example of styrene and maleic anhydride.

Extent of Disclosure

Each and every compatible combination of the embodiments described above is explicitly disclosed herein, as if each and every combination were individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each were set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the FIGURE described above.

EXAMPLES

The following non-limiting examples further illustrate the present invention.

Viscosity was measured using the Brookfield DV-E viscometer fitted with a UL adaptor. The viscosity was measured with the sample immersed in a water bath at a temperature of 25° C. in a room with a pressure of 1.013 kPa and humidity of 70%.

Conductivity was measured using an EDT Series 3 BA 380 conductivity meter using an EDT E8070 Polymer Conductivity Cell probe. The conductivity was measured with the sample warmed by a water bath at a temperature of 25° C.

Printed Ink Properties—Testing Methods

Prior to printing, the inks were filtered through 1 μm filter paper.

Print samples were created using a Domino Ax-Series print sample rig fitted with a 60 μm nozzle. Adhesion of the inks was assessed using a printed image in the form of a 9*9 array of droplets printed onto HDPE, LDPE and PP substrates. The HDPE, LDPE and PP substrates were as follows:

| Substrate | Specification | Supplier |
|---|---|---|
| HDPE | 1.5 mm HDPE 300 sheet, natural | Engineering and Design Plastics Ltd, Cambridge, UK |
| LDPE | 1.5 mm sheet, natural | Engineering and Design Plastics Ltd, Cambridge, UK |
| Polypropylene | 1.5 mm natural sheet | Engineering and Design Plastics Ltd, Cambridge, UK |
| Perspex | 1.5 mm clear cast acrylic sheet | Engineering and Design Plastics Ltd, Cambridge, UK |
| PET | 1.5 mm (Veralite 100) A-PET | Engineering and Design Plastics Ltd, Cambridge, UK |
| Polycarbonate | 1.5 mm (Lexan) clear sheet | Engineering and Design Plastics Ltd, Cambridge, UK |
| Polystyrene | 1.5 mm white sheet, high impact | Engineering and Design Plastics Ltd, Cambridge, UK |

The 60 μm nozzle was flushed with the main ink solvent prior to use each time. The substrates were cleaned with paper towels dampened with Ethanol (DEB 100) prior to printing.

Tape Removal Adhesion Tests

Tape removal adhesion tests were performed using both Scotch grade 810 (19.05 mm wide) and ISO 2409 Adhesive Tape supplied by Elcometer adhesive tapes. Scotch grade 810 (19.05 mm wide) is referred to as '810' tape and ISO 2409 is referred to as 'ISO' tape in the following description.

The tests were performed 24 h after printing. The tape removal adhesion tests were carried out at 20 to 25° C. with a relative humidity of 25 to 45%.

Around 10 cm of the tape to be tested was cut from the reel. The tape was applied to the printed image to cover the printed image completely, leaving a tail portion unattached to allow the tape to be removed. The tape was applied so that the tape did not crease or contain air bubbles. A pencil eraser was used to ensure that the tape was in uniform contact with the substrate by pressing the eraser on the centre line of the tape and pressing outwards to each edge, working along the length of the adhered portion of the tape.

The tape was then removed by pulling the unattached tail portion of the tape in a swift motion that combined both a lifting and a pulling action whilst holding the substrate firmly in place. Each test was carried out in triplicate.

The adhesion performance was scored by comparing pairs of digital microscope photographs of the printed images taken before tape application and after tape removal using Matlab software. Each such test was carried out in triplicate.

The Matlab software is used as follows:
1. A digital photograph of the printed image is taken using a Celestron Model 44302-b handheld digital microscope.
2. The digital photograph is transferred to a PC running the Matlab software.
3. The Matlab software finds a threshold value for the binarised digital photograph using Otsu's Method (i.e. level=graythresh(I)).
4. The Matlab software converts the digital photograph to black and white only, i.e., binarises the digital photograph, using the threshold value and filters out artefacts smaller than 10 pixels.
5. The Matlab software calculates the sum of the areas of the remaining features in the filtered binarised digital photograph using the function regionprops.

This process is carried out for the printed image before the tape has been applied and after it has been removed. The sum of the areas of the remaining features after the tape has been removed is deducted from the sum of the areas of the remaining features before the tape was applied.

The percentage of ink removed is calculated as follows:

$$\text{Percentage ink removed} = [(\text{sum of areas before tape applied} - \text{sum of areas after tape removed}) \div \text{sum of areas before tape applied}] \times 100.$$

Ink Compositions

Two carbon black pigment dispersions were prepared for use as colourants.

The first dispersion, referred to below as Pigment Dispersion 01, was prepared as follows. 34 wt % of MEK was mixed with 36 wt % of BASF EFKA PX 4320 dispersant using mechanical agitation. Once homogeneous, 30 wt % of Cabot Regal 250R carbon black pigment was added and mixed using a Dispermat AE 01-M1-EX high shear mixer until homogeneous to create a pre-dispersion. The pre-dispersion was milled using an Eiger Torrance lab-scale beads attrition mill loaded 85% with 0.8 mm ceramic beads.

The second dispersion, referred to below as Pigment Dispersion 02, was prepared as follows. 40 wt % of ethyl acetate was mixed with 30 wt % of BASF EFKA PX 4320 dispersant using the Dispermat AE 01-M1-EX high shear mixer. Once homogeneous, 30 wt % of Cabot Regal 250R carbon black pigment was added and mixed using the same high shear mixer until homogeneous to create a pre-dispersion. The pre-dispersion was milled using an Eiger Torrance beads attrition mill loaded 85% with 0.8 mm ceramic beads.

Inks were prepared by addition of the components in the following order with magnetic stirring: solvent, binder, surfactant, colourant and conductivity salt.

The complete inks were shaken on a lab shaker for 30 minutes prior to use.

Invention ink and comparative ink compositions were prepared with the formulations set out in Table 1 below. The amounts of the components are provided as wt % based on the total weight of the ink composition. The solvent is used to make up the balance of the ink composition in each case.

For each invention ink and comparative ink in Table 1 below, there is also a corresponding ink (labelled "NS") which does not contain the siloxane surfactant. For example, "Ink 1" is the same as "Ink 1-NS" except for the presence of the siloxane surfactant Tego Glide 410.

TABLE 1

Invention Ink and Comparative Ink Compositions

| Ink | Salt used | Salt | CAB-551-0.01 | Foralyn 110 | Tego Glide 410 | Pigment Dispersion 01 | Solvent used to make up the formulation to 100 wt. % | Conductivity $\mu S/cm$ |
|---|---|---|---|---|---|---|---|---|
| 1 | KPF6 | 1.00 | 9.00 | 5.00 | 1.00 | 5.00 | MEK | 1326 |
| 1-NS | KPF6 | 0.98 | 9.00 | 5.00 | 0.00 | 5.00 | MEK | 1347 |
| 2 | NaI | 0.89 | 9.00 | 5.00 | 1.00 | 5.00 | MEK | 908 |
| 2-NS | NaI | 0.80 | 9.00 | 5.00 | 0.00 | 5.00 | MEK | 990 |
| 3 | KSCN | 1.01 | 9.00 | 5.00 | 1.00 | 5.00 | MEK | 1070 |
| 3-NS | KSCN | 1.03 | 9.00 | 5.00 | 0.00 | 5.00 | MEK | 1140 |
| 4 | NaSCN | 1.00 | 9.00 | 5.00 | 1.00 | 5.00 | MEK | 750 |
| 4-NS | NaSCN | 0.99 | 9.00 | 5.00 | 0.00 | 5.00 | MEK | 810 |
| Comp. 1 | TBAPF6 | 1.01 | 9.00 | 5.00 | 1.00 | 5.00 | MEK | 940 |
| Comp. 1-NS | TBAPF6 | 0.98 | 9.00 | 5.00 | 0.00 | 5.00 | MEK | 940 |
| Comp. 2 | TBABr | 1.01 | 9.00 | 5.00 | 1.00 | 5.00 | MEK | 450 |
| Comp. 2-NS | TBABr | 1.01 | 9.00 | 5.00 | 0.00 | 5.00 | MEK | 470 |
| Comp. 3 | TBANO3 | 1.02 | 9.00 | 5.00 | 1.00 | 5.00 | MEK | 620 |
| Comp. 3-NS | TBANO3 | 0.98 | 9.00 | 5.00 | 0.00 | 5.00 | MEK | 620 |

CAB 551-0.01 is a cellulose acetate butyrate product with a low hydroxyl content (1.5%) that is commercially available from Eastman.

Tego Glide 410 is a polyether modified polysiloxane surfactant that is commercially available from Evonik.

Foralyn is an ester of hydrogenated rosin commercially available from Eastman, specifically Foralyn 110.

The salts and solvents used were obtained from Sigma Aldrich and Alfa Aesar.

FIG. 1 shows in the rows labelled 1-NS, 1, C1-NS and C1 pairs of images printed on HDPE substrates using invention ink 1 without the siloxane surfactant, invention ink 1 with the siloxane surfactant, comparative ink 1 without the siloxane surfactant, and comparative ink 1 with the siloxane surfactant, respectively. The left-hand column (labelled A) shows each printed image before application of 810 tape, and the right-hand column (labelled B) shows each printed image after removal of the 810 tape.

Comparison of images 1-NS B and 1 B shows that the presence of the siloxane surfactant in invention ink 1 significantly improved the adhesion of the printed image to the substrate.

Comparison of images C1-NS B and C1 B shows that the presence of the siloxane surfactant in comparative ink 1, on the other hand, significantly reduced the adhesion of the printed image to the substrate.

It will be noted that from a comparison of images 1-NS A and 1 A and C1-NS A and C1 A that the presence of the siloxane surfactant in the invention and comparative inks reduced the spreading of the droplets making up the printed images across the HDPE substrate. This effect appears to be independent of any effect on adhesion.

Tape Removal Adhesion Test Results

Tape removal adhesion tests as described above were carried out for each of the invention inks and comparative inks set out in Table 1 above by printing a printed image using each of the inks on substrates of each type (HDPE, LDPE and PP). Each of the printed substrates was then subjected to the tape removal adhesion test in triplicate, i.e. three printed images were tested on each type of substrate for each ink, and the average of the results calculated for each ink. The results are provided in Table 2 below.

TABLE 2

Tape Removal Adhesion Test Results

| Ink | Salt used | ISO TAPE (% Ink Removed) | | | 810 TAPE (% Ink Removed) | | |
|---|---|---|---|---|---|---|---|
| | | HDPE | LDPE | PP | HDPE | LDPE | PP |
| 1 | KPF6 | 13 | 1 | 48 | 11 | 22 | 23 |
| 1-NS | KPF6 | 70 | 90 | 95 | 95 | 90 | 96 |
| 2 | NaI | 35 | 82 | 70 | 61 | 84 | 74 |
| 2-NS | NaI | 86 | 30 | 86 | 90 | 94 | 95 |
| 3 | KSCN | 95 | 94 | 91 | 89 | 99 | 95 |
| 3-NS | KSCN | 99 | 98 | 96 | 99 | 98 | 100 |
| 4 | NaSCN | 80 | 95 | 88 | 78 | 97 | 83 |
| 4-NS | NaSCN | 98 | 100 | 93 | 98 | 100 | 99 |
| Comp. 1 | TBAPF6 | 89 | 100 | 100 | 95 | 100 | 100 |
| Comp. 1-NS | TBAPF6 | 6 | 28 | 26 | 31 | 14 | 58 |
| Comp. 2 | TBABr | | | | 95 | 95 | 95 |
| Comp. 2-NS | TBABr | | | | 5 | 5 | 5 |
| Comp. 3 | TBANO3 | | | | 95 | 95 | 95 |
| Comp. 3-NS | TBANO3 | | | | 20 | 20 | 20 |

The tape removal adhesion test results show a clear improvement in adhesion for invention inks 1 to 4, which include the metal salts potassium hexafluorophosphate (KPF6), sodium iodide (NaI), potassium thiocyanate (KSCN) and sodium thiocyanate (NaSCN), respectively, when the siloxane surfactant is present. Conversely, a marked deterioration in adhesion is seen for comparative inks 1 to 3, which include the non-metal salts tetrabutylammonium hexafluorophosphate (TBAPF6), tetrabutylammonium bromide (TBABr) and tetrabutylammonium nitrate (TBANO3), respectively, when the siloxane surfactant is present.

Metal Conductivity Salt Concentration

The effect of the concentration of the metal conductivity salt was studied.

A range of inks was prepared using the procedure set out above with varying amounts of the metal conductivity salt. The formulations of the inks are set out in Table 3 below.

TABLE 3

Varying Salt Concentration Compositions

| | | | Raw materials wt. % | | | Solvent used to make up the formulation to 100 wt. % | Conductivity µS/cm |
|---|---|---|---|---|---|---|---|
| Ink | Salt used | Salt | CAB-551-0.01 | Foralyn 110 | Tego Glide 410 | Pigment Dispersion 01 | | |
| 5 | KPF6 | 0.31 | 9.00 | 5.00 | 1.00 | 5.00 | MEK | 560 |
| 6 | KPF6 | 0.49 | 9.00 | 5.00 | 1.00 | 5.00 | MEK | 810 |
| 1 | KPF6 | 1.00 | 9.00 | 5.00 | 1.00 | 5.00 | MEK | 1326 |
| 7 | KPF6 | 1.52 | 9.00 | 5.00 | 1.00 | 5.00 | MEK | 1860 |
| 8 | KPF6 | 1.96 | 9.00 | 5.00 | 1.00 | 5.00 | MEK | 2200 |
| 9 | NaI | 0.47 | 9.00 | 5.00 | 1.00 | 5.00 | MEK | 800 |
| 2 | NaI | 0.89 | 9.00 | 5.00 | 1.00 | 5.00 | MEK | 908 |
| 10 | NaI | 1.55 | 9.00 | 5.00 | 1.00 | 5.00 | MEK | 2000 |
| 11 | KSCN | 0.54 | 9.00 | 5.00 | 1.00 | 5.00 | MEK | 1318 |
| 3 | KSCN | 1.01 | 9.00 | 5.00 | 1.00 | 5.00 | MEK | 1070 |
| 12 | KSCN | 1.53 | 9.00 | 5.00 | 1.00 | 5.00 | MEK | 2880 |

Tape removal adhesion tests as described above were carried out on each of the inks. The results of these tests are shown in Table 4 below.

TABLE 4

Varying Salt Concentration Results

| | | ISO TAPE (% Ink Removed) | | | 810 TAPE (% Ink Removed) | | |
|---|---|---|---|---|---|---|---|
| Ink | Salt used | HDPE | LDPE | PP | HDPE | LDPE | PP |
| 5 | KPF6 | 27 | 38 | 22 | 14 | 57 | 39 |
| 6 | KPF6 | 8 | 45 | 6 | 17 | 50 | 21 |
| 1 | KPF6 | 13 | 1 | 48 | 11 | 22 | 23 |
| 7 | KPF6 | 52 | 52 | 86 | 24 | 33 | 89 |
| 8 | KPF6 | 44 | 18 | 82 | 28 | 50 | 84 |
| 9 | NaI | 88 | 81 | 93 | 70 | 87 | 89 |
| 2 | NaI | 35 | 82 | 70 | 61 | 84 | 74 |
| 10 | NaI | 95 | 92 | 99 | 80 | 95 | 88 |
| 11 | KSCN | 95 | 80 | 95 | 71 | 55 | 89 |
| 3 | KSCN | 96 | 94 | 91 | 89 | 99 | 95 |
| 12 | KSCN | 98 | 98 | 90 | 88 | 99 | 88 |

Good adhesion can generally be seen for the invention inks containing KPF6 or NaI, with the best adhesion results for the KPF6 series being seen for invention ink 1 and the best adhesion results for the NaI series being seen for invention ink 2.

In the KSCN series the best adhesion results are seen for invention ink 11.

Surfactant Amount

The effect of the amount of surfactant was studied.

A range of inks was prepared using the procedure set out above with varying amounts of the siloxane surfactant. The formulations of the inks are set out in Table 5 below.

TABLE 5

Varying Surfactant Amount Compositions

| Ink | Salt used | KPF6 | CAB-551-0.01 | Foralyn 110 | Tego Glide 410 | Pigment Dispersion 01 | Solvent used to make up the formulation to 100 wt. % |
|---|---|---|---|---|---|---|---|
| 13-NS | KPF6 | 1.01 | 9.00 | 5.00 | 0.00 | 5.00 | MEK |
| 14 | KPF6 | 1.01 | 9.00 | 5.00 | 0.06 | 5.00 | MEK |
| 15 | KPF6 | 1.01 | 9.00 | 5.00 | 0.27 | 5.00 | MEK |
| 16 | KPF6 | 1.01 | 9.00 | 5.00 | 0.52 | 5.00 | MEK |
| 17 | KPF6 | 1.00 | 9.00 | 5.00 | 0.72 | 5.00 | MEK |
| 1 | KPF6 | 1.00 | 9.00 | 5.00 | 1.02 | 5.00 | MEK |
| 18 | KPF6 | 0.99 | 9.00 | 5.00 | 2.00 | 5.00 | MEK |

Tape removal adhesion tests as described above were carried out on each of the inks using ISO tape on the LDPE substrate only. The results of these tests are shown in Table 6 below.

TABLE 6

Varying Surfactant Amount Results

| | | (% Ink Removed) | |
|---|---|---|---|
| Ink | Tego Glide 410 wt % | ISO TAPE LDPE only | 810 |
| 13 - NS | 0.00 | 84 | 95 |
| 14 | 0.06 | 68 | 86 |
| 15 | 0.27 | 60 | 56 |
| 16 | 0.52 | 40 | 23 |
| 17 | 0.72 | 31 | 20 |
| 1 | 1.02 | 10 | 26 |
| 18 | 2.00 | 13 | 11 |

Good adhesion is seen for invention inks 16, 17, 1 and 18, with the best adhesion results being seen for invention inks 1 and 18. Invention inks 16 and 17 can be seen to give similar adhesion results to invention ink 1 when tested using the 810 tape.

Surfactant Type

The effects of different surfactants were studied.

A range of inks was prepared using the procedure set out above with different surfactant types. The formulations of the inks are set out in Table 7 below.

TABLE 7

Different Surfactant Compositions

| Ink | Surfactant Used | KPF6 | CAB-551-0.01 | Foralyn 110 | Surfactant | Pigment Dispersion 01 | Solvent used to make up the formulation to 100 wt. % |
|---|---|---|---|---|---|---|---|
| 19 | Tego Wet 500 | 1.00 | 9.00 | 5.00 | 1.00 | 5.00 | MEK |
| 20 | BYK 333 | 1.00 | 9.00 | 5.00 | 1.00 | 5.00 | MEK |
| 1 | Tego Glide 410 | 1.00 | 9.00 | 5.00 | 1.00 | 5.00 | MEK |

BYK 333 is a polyether modified polydimethylsiloxane surfactant available from BYK.

Tego Wet 500 is a non-ionic organic surfactant available from Evonik. Tego Wet 500 is silicone free.

Tape removal adhesion tests as described above were carried out on each of the inks. The results of these tests are shown in Table 8 below.

TABLE 8

Different Surfactant Results

| | | ISO TAPE (% Ink Removed) | | | 810 TAPE (% Ink Removed) | | |
|---|---|---|---|---|---|---|---|
| Ink | Surfactant Used | HDPE | LDPE | PP | HDPE | LDPE | PP |
| 19 | Tego Wet 500 | 67 | 48 | 93 | 88 | 83 | 93 |
| 20 | BYK 333 | 23 | 7 | 38 | 20 | 13 | 69 |
| 1 | Tego Glide 410 | 13 | 1 | 49 | 11 | 22 | 23 |

Good adhesion is seen for invention inks 20 and 1, particularly on HDPE and LDPE substrates. The adhesion of ink 19, which contains a surfactant that is not a siloxane surfactant, is disappointing.

Different Colourants

The effects of different colourants were studied.

A range of inks was prepared using the procedure set out above with different colourants. The formulations of the inks are set out Table 9 below.

TABLE 9

Different Colourant Compositions

| | | | | Raw materials wt. % | | | | Solvent used to make up the formulation to 100 wt. % | Conductivity μS/cm |
|---|---|---|---|---|---|---|---|---|---|
| Ink | Colourant Used | Salt Used | Salt | CAB-551-0.01 | Foralyn 110 | Tego Glide 410 | Colourant | | |
| Comp. 4 | Orasol 855 | TBAPF6 | 0.98 | 9.00 | 5.00 | 1.00 | 1.50 | MEK | 977 |
| 21 | Orasol 855 | KPF6 | 0.96 | 9.00 | 5.00 | 1.00 | 1.50 | MEK | 1620 |
| Comp. 5 | Solvaperm blue 2B | TBAPF6 | 0.98 | 9.00 | 5.00 | 1.00 | 1.50 | MEK | 1010 |
| 22 | Solvaperm blue 2B | KPF6 | 1.00 | 9.00 | 5.00 | 1.00 | 1.50 | MEK | 1475 |

Solvaperm Blue 2B is a solvent blue 104 dye that is commercially available from Clariant.

Orasol 855 is a solvent blue 70 dye that is commercially available from BASF SE.

Tape removal adhesion tests were carried out on each of the inks, but instead of using the Matlab software to compare before and after photographs, a simple visual inspection was carried out and the adhesion graded in accordance with the criteria set out in Table 10 below. The resulting gradings are set out in Table 11 below.

TABLE 10

| Grading Criteria for Adhesion Grading System for Adhesion | |
|---|---|
| Excellent | No ink removed |
| Good | Some dots removed, very easy to read the code |
| Moderate | Code partially removed, possible to read the code |
| Poor | Most dots removed, not possible to read |
| Very Poor | Code completely removed |

TABLE 11

Different Colourant Results

| Ink | Colourant Used | Salt Used | ISO TAPE | | | 810 TAPE | | |
|---|---|---|---|---|---|---|---|---|
| | | | HDPE | LDPE | PP | HDPE | LDPE | PP |
| Comp. 4 | Orasol 855 | TBAPF6 | Poor | Poor | Poor | Poor | Very Poor | Poor |
| 21 | Orasol 855 | KPF6 | Excellent | Excellent | Excellent | Excellent | Excellent | Excellent |
| Comp. 5 | Solvaperm blue 2B | TBAPF6 | very poor | very poor | very poor | very poor | very poor | very poor |
| 22 | Solvaperm blue 2B | KPF6 | Good | Good | Moderate | Good | Good | Good |

The tape removal adhesion test generally shows at least good adhesion for invention inks 21 and 22, which use colourants in the form of solvent dyes. The poor adhesion of comparative inks using the same colourants but a non-metal conductivity salt is striking.

Different Solvents

The effects of different solvents, metal conductivity salts, and pigment dispersions were studied.

A range of inks was prepared using the procedure set out above with different solvents, metal conductivity salts and pigment dispersions. The adhesion promoters Tego Variplus CA and Tytan AP 100 were also included. The formulations of the inks are set out in Table 12 below.

TABLE 12

Different Solvents, Metal Conductivity Salts and Pigment Dispersions Compositions

| Ink | Salt Used | Salt | CAB-551-0.01 | Foralyn 110 | Tego Glide 410 | Pigment Dispersion 02 | Tego Variplus CA | Tytan AP100 | Conductivity μS/cm | Solvent used to make up the formulation to 100 wt. % |
|---|---|---|---|---|---|---|---|---|---|---|
| 23 | KI | 1.52 | 5.00 | 2.00 | 1.00 | 5.00 | 10.00 | 3.00 | 730 | EtOH 56%/ Ethyl Acetate 44% |
| 23-NS | KI | 1.52 | 5.00 | 2.00 | 0.00 | 5.00 | 10.00 | 3.00 | 760 | |
| 24 | LiNO3 | 2.06 | 5.00 | 2.00 | 1.00 | 5.00 | 10.00 | 3.00 | 1270 | |
| 24-NS | LiNO3 | 2.06 | 5.00 | 2.00 | 0.00 | 5.00 | 10.00 | 3.00 | 1320 | |

Tego Variplus CA is a ketone condensation resin available from Evonik.

Tytan AP 100 is a titanium phosphate complex from Borica Company Ltd.

Tape removal adhesion tests as described above were carried out on each of the inks using the Matlab software. The results of these tests are shown in Table 13 below.

TABLE 13

Different Solvents, Metal Conductivity Salts and Pigment Dispersions Results

| Ink | Salt Used | ISO TAPE | | | 810 TAPE | | |
|---|---|---|---|---|---|---|---|
| | | HDPE | LDPE | PP | HDPE | LDPE | PP |
| 23 | KI | 17 | 15 | 20 | 14 | 10 | 29 |
| 23-NS | KI | 20 | 42 | 61 | 32 | 19 | 67 |
| 24 | LiNO3 | 14 | 22 | 2 | 26 | 20 | 23 |
| 24-NS | LiNO3 | 39 | 21 | 53 | 44 | 44 | 64 |

Good adhesion is seen for invention inks 23 and 24, which both use a liquid carrier in the form of a mixture of the organic solvents ethanol and ethyl acetate, and use a metal conductivity salt in the form of potassium iodide and lithium nitrate, respectively.

Second Aspect

Further Ink Compositions

Two carbon black pigment dispersions were prepared for use as colourants.

The first dispersion, referred to below as Pigment Dispersion 01, was prepared as follows. 34 wt % of MEK was mixed with 36 wt % of BASF EFKA PX 4320 dispersant using mechanical agitation. Once homogeneous, 30 wt % of Cabot Regal 250R carbon black pigment was added and mixed using a Dispermat AE 01-M1-EX high shear mixer until homogeneous to create a pre-dispersion. The pre-dispersion was milled using an Eiger Torrance lab-scale beads attrition mill loaded 85% with 0.8 mm ceramic beads.

The third dispersion, referred to below as Pigment Dispersion 03, was prepared as follows. 36 wt % of ethanol was mixed with 24 wt % of BASF EFKA PX 4320 dispersant using the Dispermat AE 01-M1-EX high shear mixer. Once homogeneous, 40 wt % of Cabot Mogul E carbon black pigment was added and mixed using the same high shear mixer until homogeneous to create a pre-dispersion. The pre-dispersion was milled using an Eiger Torrance beads attrition mill loaded 85% with 0.8 mm ceramic beads.

Inks were prepared by addition of the components in the following order with magnetic stirring: solvent, binder, surfactant, colourant, conductivity salt and, if present, crosslinker. The ink compositions are show in table 14. The complete inks were shaken on a lab shaker for 30 minutes prior to use.

TABLE 14

Further ink compositions

| Ink formulation | MEK | EtOH | Methoxpropanol | CAB 551 | Foralyn 110 | Dertophne T | Dianal PB204 | Joncryl 611 |
|---|---|---|---|---|---|---|---|---|
| 25 | 77 | | | 9 | 5 | | | |
| 26 | 68 | 10 | | 9 | 5 | | | |
| 27 | 78 | | | 9 | 5 | | | |
| 28 | | 37.5 | 42 | | | 1.5 | 10 | |
| 29 | | 37.5 | 42 | | | 1.5 | | 10.5 |
| Comp 6 | 66 | 9 | | 9 | 5 | | | |
| Comp 7 | | 34.5 | 42 | | | 1.5 | 10 | |

| Ink formulation | Tego 410 | Dispersion 1 | Dispersion 3 | KPF6 | TBAPF6 | TBABr | LiNO3 | Tytan AP 100 |
|---|---|---|---|---|---|---|---|---|
| 25 | 1 | 7 | | 1 | | | | |
| 26 | 0 | 7 | | | 1 | | | |
| 27 | 0 | 7 | | | | 1 | | |
| 28 | 0.5 | | 7.5 | | | | 1 | |
| 29 | | | 7.5 | | 1 | | | |
| Comp 6 | 0 | 7 | | | 1 | | | 3 |
| Comp 7 | 0.5 | | 7.5 | | | 1 | | 3 |

CAB 551-0.01 is a cellulose acetate butyrate product with a low hydroxyl content (1.5%) that is commercially available from Eastman.

Tego Glide 410 is a polyether modified polysiloxane surfactant that is commercially available from Evonik.

Foralyn is an ester of hydrogenated rosin commercially available from Eastman, specifically Foralyn 110.

Dertophene T is a terpene phenolic resin commercially available from DRT.

Dianal PB-204 is a low molecular weight, high acid number acrylic resin commercially available from Dianal America.

Joncryl 611 is a styrene acrylic resin commercially available from BASF.

Tytan AP 100 is a titanium phosphate complex commercially available from Borica.

BASF EFKA PX 4320 is an acrylic block-copolymer dispersant commercially available from BASF.

The salts and solvents used were obtained from Sigma Aldrich and Alfa Aesar.

Further Tape Removal Adhesion Test Results

The tape adhesion test was carried out for the inks of Table 14 using the method disclosed above. The results of the tape adhesion test on a variety of different substrates is provided below in Table 15.

TABLE 15

Further Tape adhesion Tests

| Formulation | | 810 | | | | ISO | | | |
|---|---|---|---|---|---|---|---|---|---|
| | | 1 | 2 | 3 | Av | 1 | 2 | 3 | Av |
| 25 | HDPE | 17 | 5 | 3 | 8 | 2 | 14 | 17 | 11 |
| | Perspex | 1 | 0 | 2 | 1 | 3 | 0 | 3 | 2 |
| | PET | 5 | 2 | 7 | 5 | 1 | 5 | 0 | 2 |
| | Polycarbonate | 3 | 6 | 5 | 5 | 2 | 5 | 4 | 4 |
| | Polystyrene | 12 | 11 | 5 | 9 | 8 | 20 | 14 | 14 |
| | PP | 27 | 46 | 27 | 33 | 27 | 50 | 18 | 32 |
| 26 | HDPE | 21 | 5 | 17 | 14 | 32 | 7 | 11 | 17 |
| | Perspex | 12 | 37 | 0 | 16 | 30 | 32 | 23 | 28 |
| | PET | 40 | 11 | 31 | 27 | 35 | 20 | 24 | 26 |
| | Polycarbonate | 9 | 12 | 7 | 9 | 6 | 5 | 6 | 6 |
| | Polystyrene | 4 | 4 | 5 | 4 | 7 | 7 | 1 | 5 |
| | PP | 70 | 72 | 82 | 75 | 83 | 64 | 49 | 65 |
| 27 | HDPE | 48 | 70 | 34 | 51 | 3 | 10 | 13 | 9 |
| | Perspex | 2 | 19 | 18 | 13 | 6 | 3 | 10 | 6 |
| | PET | 2 | 0 | 0 | 1 | 3 | 5 | 3 | 4 |

TABLE 15-continued

Further Tape adhesion Tests

| Formulation | | 810 | | | | ISO | | | |
|---|---|---|---|---|---|---|---|---|---|
| | | 1 | 2 | 3 | Av | 1 | 2 | 3 | Av |
| | Polycarbonate | 1 | 1 | 0 | 1 | 0 | 1 | 0 | 0 |
| | Polystyrene | 3 | 58 | 4 | 22 | 13 | 11 | 12 | 12 |
| | PP | 13 | 19 | 12 | 15 | 58 | 4 | 15 | 26 |
| 28 | HDPE | 30 | 41 | 48 | 40 | 28 | 36 | 31 | 32 |
| | Perspex | 1 | 4 | 3 | 3 | 5 | 9 | 5 | 6 |
| | PET | 2 | 3 | 4 | 3 | 9 | 11 | 4 | 8 |
| | Polycarbonate | 1 | 0 | 2 | 1 | 1 | 0 | 1 | 1 |
| | Polystyrene | 8 | 1 | 3 | 4 | 2 | 5 | 4 | 4 |
| | PP | 26 | 26 | 27 | 26 | 17 | 13 | 26 | 19 |
| 29 | HDPE | 33 | 31 | 43 | 36 | 55 | 52 | 46 | 51 |
| | Perspex | 2 | 17 | 0 | 6 | 22 | 36 | 25 | 28 |
| | PET | 4 | 4 | 2 | 3 | 10 | 5 | 12 | 9 |
| | Polycarbonate | 12 | 17 | 4 | 11 | 28 | 4 | 52 | 28 |
| | Polystyrene | 20 | 2 | 11 | 11 | 10 | 5 | 13 | 9 |
| | PP | 46 | 39 | 46 | 44 | 34 | 51 | 63 | 49 |
| Comp 6 | HDPE | 30 | 34 | 27 | 30 | 10 | 11 | 6 | 9 |
| | Perspex | 27 | 18 | 22 | 22 | 8 | 1 | 17 | 9 |
| | PET | 2 | 3 | 2 | 2 | 1 | 2 | 4 | 2 |
| | Polycarbonate | 2 | 8 | 7 | 6 | 9 | 9 | 12 | 10 |
| | Polystyrene | 5 | 4 | 4 | 4 | 29 | 1 | 9 | 13 |
| | PP | 0 | 7 | 2 | 3 | 16 | 7 | 5 | 9 |
| Comp 7 | HDPE | 19 | 29 | 30 | 26 | 19 | 15 | 28 | 21 |
| | Perspex | 5 | 8 | 3 | 5 | 7 | 1 | 1 | 3 |
| | PET | 5 | 6 | 11 | 7 | 3 | 2 | 4 | 3 |
| | Polycarbonate | 0 | 1 | 2 | 1 | 0 | 1 | 1 | 1 |
| | Polystyrene | 76 | 3 | 5 | 28 | 9 | 3 | 6 | 6 |
| | PP | 19 | 36 | 22 | 26 | 8 | 14 | 16 | 13 |

Coating and Washing Procedure

MACOR machinable glass ceramic sheets (100 mm×50 mm×1 mm) were ordered from Goodfellow Cambridge Ltd. MACOR glass ceramic sheets are manufactured by Corning.

A drawdown on the ceramic material was made using a 100 μm k-bar was made with each of the inks.

The drawdown was allowed to dry for 30 minutes in a 70° C. oven, to ensure the ink drawdown was completely dry.

The ceramic samples were washed by:
Soaking the ceramic material in the washing solvent for 5 minutes.
Submerging the ceramic material in clean solvent for 60 sections, moving the piece around with a pair of tweezers.
Submerging the ceramic material into fresh solvent for 10 seconds to ensure no further ink was removed and the final solvent remained clear.

Different wash solvents were used, depending on the main solvent composition of the ink The coating and washing steps were performed 5 times.

Surface Resistance after Washing

After 5 washes, the surface resistance of the ceramic material was measured. Silver conductive paint (purchased from Electrolube, silver content of 45%) was used to paint conductive electrodes directly on the surface of the washed ceramic, spaced 0.5 cm apart, 2 cm from the bottom of the ceramic sheet and in the centre. The electrodes were approximately 0.2 cm thick and 1.3 cm long. Each electrode was checked to ensure a resistance of less than 10Ω was achieved within the silver painted electrode, subsequently thicker layers of paint were used until this threshold was reached.

The surface resistance was determined using a Fluke 117 True RMS digital multimeter, from Fluke Corporation. The ends of the multimeter were placed on the silver electrodes and the resistance was measured. When no resistance was recorded (i.e. could not be measured), infinity was recorded as the result.

TABLE 16

Surface resistance after washing

| Ink Formulation | Wash Solvent | Measured Resistance | Surface Resistance |
|---|---|---|---|
| 25 | MEK | ∞ | ∞ |
| 26 | MEK | ∞ | ∞ |
| 27 | MEK | ∞ | ∞ |
| 28 | MEK | 3.696 MΩ | 9.610 MΩ/sq |
| 29 | MEK | ∞ | ∞ |
| Comp 6 | MEK | 8.59 kΩ | 22.33 kΩ/sq |
| Comp 7 | MEK | 125.1 kΩ | 325.26 kΩ/sq |
| 28 | MePOH | ∞ | ∞ |

The results in Table 16 show that the comparative inks containing crosslinkers have a low surface resistance after washing and hence are conductive. These inks will exhibit problems of electrical shorting when used in a printer due to this conductivity after washing. The inks of the invention all have a high, in most cases infinite surface resistance after washing. These inks will not exhibit problems of electrical shorting when used in a printer after washing.

The invention claimed is:

1. An ink composition comprising:
a liquid carrier, carbon black, a conductivity salt, and a ketone condensation resin adhesion promoter;
wherein a printed deposit of the ink composition has a surface resistance of at least 2 MΩ/sq after washing the printed deposit with the liquid carrier and an adhesion of 50% or more after applying an adhesive tape to the printed deposit and removing the adhesive tape.

2. The ink composition of claim 1, having less than 1 wt % of cross linkers based on total weight of the composition.

3. The ink composition of claim 2, wherein the ink composition has less than 1 wt % of metal crosslinkers, alkoxysilanes, acrylated phosphoric acid, cationic UV curable epoxy monomers, isocyanate crosslinkers and amino resins combined based on total weight of the composition.

4. The ink composition of claim 1, wherein the ink composition further comprises a binder.

5. The ink composition of claim 4, wherein the binder is present in from 3 to 20 wt % based on total weight of the ink composition.

6. The ink composition of claim 1, further comprising a tackifier.

7. The ink composition of claim 6 wherein the tackifier is present in less than 2.5 wt % based on the total weight of the ink composition.

8. The ink composition of claim 1, wherein a printed deposit of the ink composition has a surface resistance of at least 10 MΩ/sq after washing the printed deposit with the liquid carrier.

9. The ink composition of claim 1, wherein a printed deposit of the ink composition has an adhesion of 60% or more after applying an adhesive tape to the printed deposit and removing the adhesive tape.

10. The ink composition of claim 1, wherein carbon black is present in the ink composition at between 2 to 7 wt % based on total weight of the ink composition.

11. The ink composition of claim 1, further comprising a surfactant.

12. The ink composition of claim 11 comprising up to 1.5 wt % of surfactant based on the total weight of the composition.

13. The ink composition of claim 1 wherein the conductivity salt is present at 0.3 to 4.0 wt % based on total weight of the ink composition.

14. The ink composition of claim 1, wherein the liquid carrier is an organic solvent.

15. The ink composition of claim 14, wherein the organic solvent is a combination of methyl ethyl ketone with ethanol, ethanol with ethyl acetate and/or methyl acetate, ethanol with 1 methoxy-2-propanol or acetone with methyl acetate.

16. The ink composition of claim 1, wherein water is present at 5 wt % or less based on the total weight of the ink composition, or wherein the ink composition is a non-aqueous composition.

17. The ink composition of claim 1, wherein the ink is an inkjet ink.

18. A printing method comprising a step of depositing an ink composition according to claim 1 onto a substrate, and a step of permitting at least partial evaporation of at least a component of the liquid carrier.

19. An article marked with a printed deposit using the method of claim 18.

20. The ink composition of claim 1, further comprising a dispersant.

* * * * *